United States Patent
Maeto

(10) Patent No.: US 10,923,144 B2
(45) Date of Patent: Feb. 16, 2021

(54) MAGNETIC DISK DEVICE AND READ PROCESSING METHOD

(71) Applicants: Kabushiki Kaisha Toshiba, Tokyo (JP); Toshiba Electronic Devices & Storage Corporation, Tokyo (JP)

(72) Inventor: Nobuhiro Maeto, Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/554,129

(22) Filed: Aug. 28, 2019

(65) Prior Publication Data

US 2020/0251131 A1  Aug. 6, 2020

(30) Foreign Application Priority Data

Feb. 1, 2019  (JP) .................. 2019-016893

(51) Int. Cl.
*G11B 5/54*  (2006.01)
*G11B 5/56*  (2006.01)
*G11B 5/012* (2006.01)
*G11B 20/20* (2006.01)
*G11B 21/08* (2006.01)

(52) U.S. Cl.
CPC .............. *G11B 5/012* (2013.01); *G11B 20/20* (2013.01); *G11B 21/083* (2013.01)

(58) Field of Classification Search
CPC ........ G11B 20/10388; G11B 20/10037; G11B 20/10046; G11B 20/182; G11B 5/29; G11B 5/02; G11B 20/14; G11B 20/10222; G11B 2020/1232; G11B 2220/2516; G11B 20/1403; G11B 5/5965; G11B 5/012; G11B 27/36; G11B 2220/20; G11B 5/3133; G11B 5/54
USPC ... 360/39, 40, 51, 25, 31, 77.02, 75, 67, 53, 360/77.01
See application file for complete search history.

(56) References Cited

U.S. PATENT DOCUMENTS

| | | | |
|---|---|---|---|
| 8,879,186 B1* | 11/2014 | Xia | G11B 20/182 360/31 |
| 8,988,812 B1 | 3/2015 | Brunnett et al. | |
| 9,099,125 B1 | 8/2015 | Hattori et al. | |
| 9,245,556 B2 | 1/2016 | Brunnett et al. | |
| 9,305,593 B2* | 4/2016 | Hwang | G11B 5/56 |
| 9,576,597 B2* | 2/2017 | Trantham | G11B 5/5543 |
| 9,875,758 B1* | 1/2018 | Trantham | G11B 5/29 |
| 10,210,891 B1* | 2/2019 | Tian | G11B 5/012 |

(Continued)

FOREIGN PATENT DOCUMENTS

| | | |
|---|---|---|
| JP | 2009-217911 A | 9/2009 |
| JP | 2016-110680 A | 6/2016 |

*Primary Examiner* — Nabil Z Hindi
(74) *Attorney, Agent, or Firm* — White & Case LLP

(57) ABSTRACT

According to one embodiment, a magnetic disk device includes a disk, a head including a write head that writes data to the disk, and a first read head and a second read head that read data from the disk, and a controller that, in reading a first track of a first region of the disk, positions a middle portion of the first read head and the second read head at a first track center of the first track, and in reading a second track of a second region of the disk different from the first region, positions any one of the first read head and the second read head at a second track center of the second track.

16 Claims, 13 Drawing Sheets

(56) References Cited

U.S. PATENT DOCUMENTS

| | | |
|---|---|---|
| 2015/0170676 A1 | 6/2015 | Hwang et al. |
| 2016/0171993 A1* | 6/2016 | Okubo ................ G11B 5/3179 360/61 |
| 2018/0144764 A1 | 5/2018 | Trantham et al. |

* cited by examiner

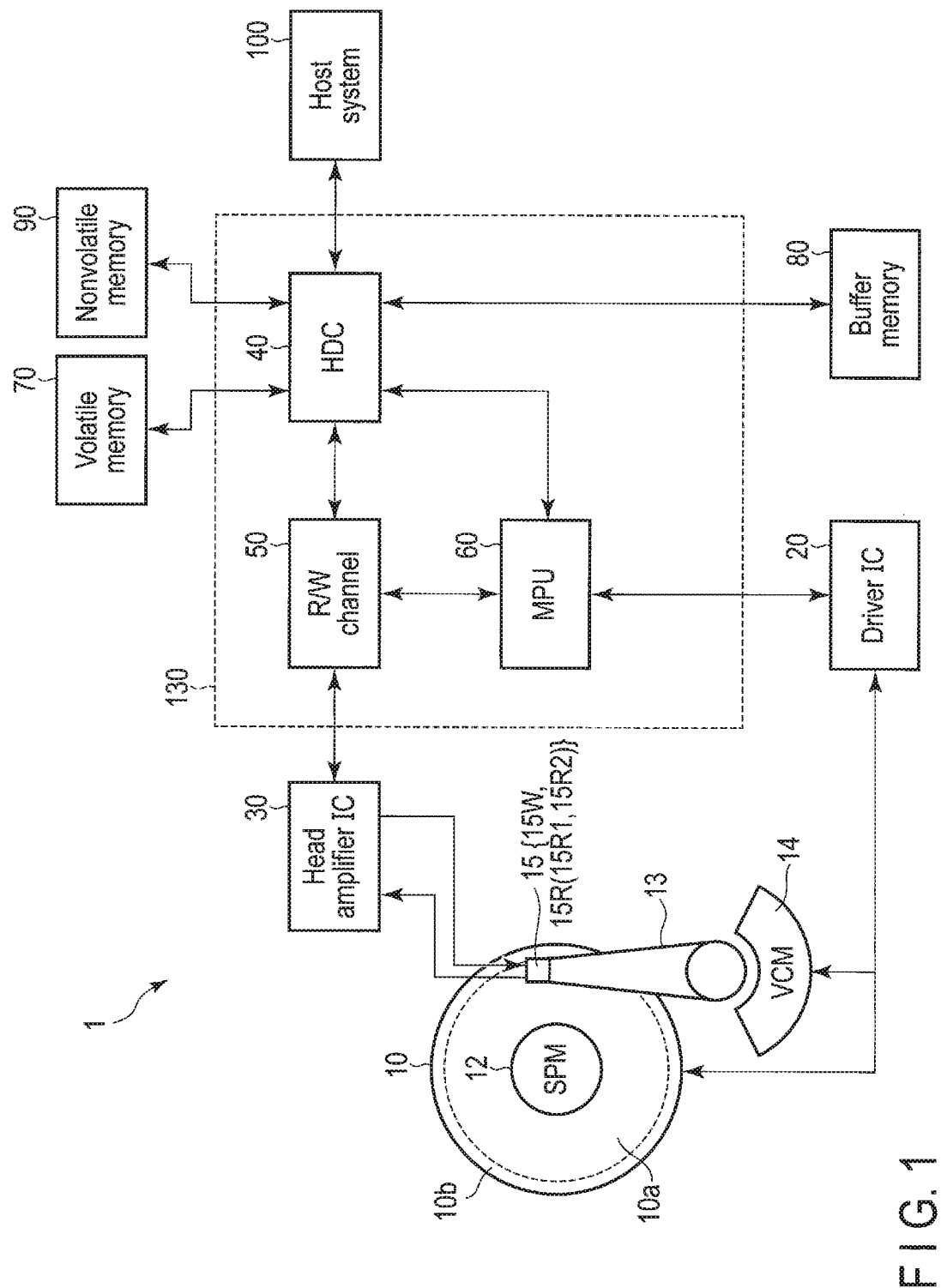
F I G. 1

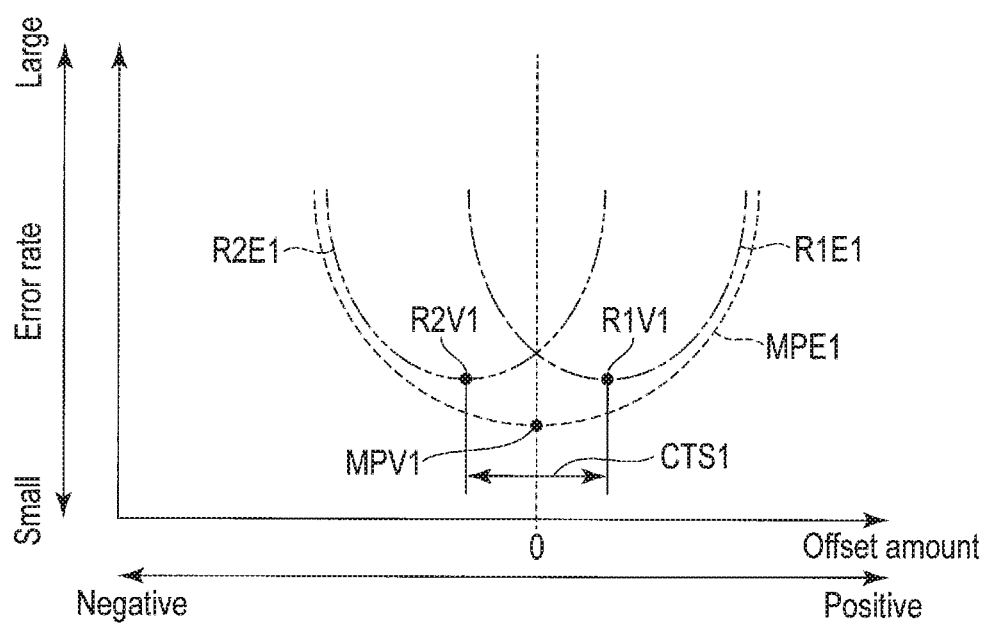
F I G. 6

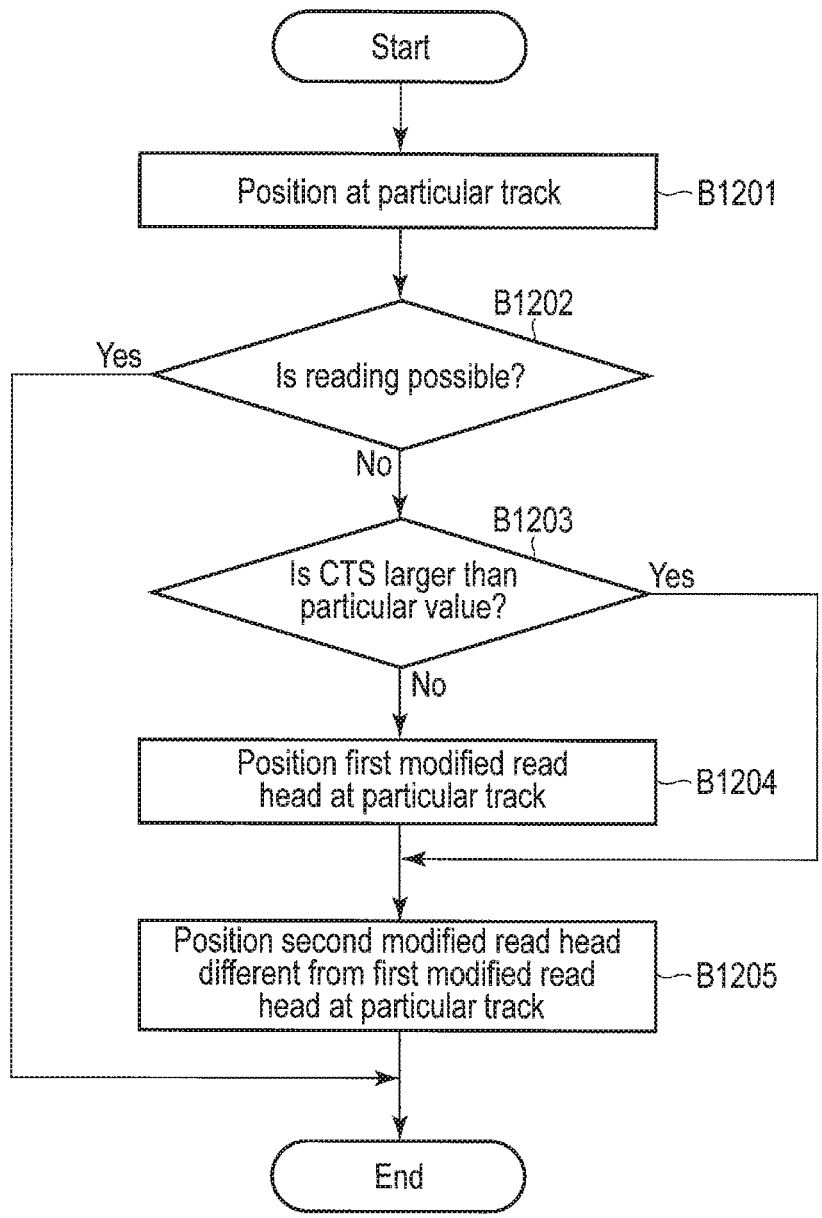
F I G. 12

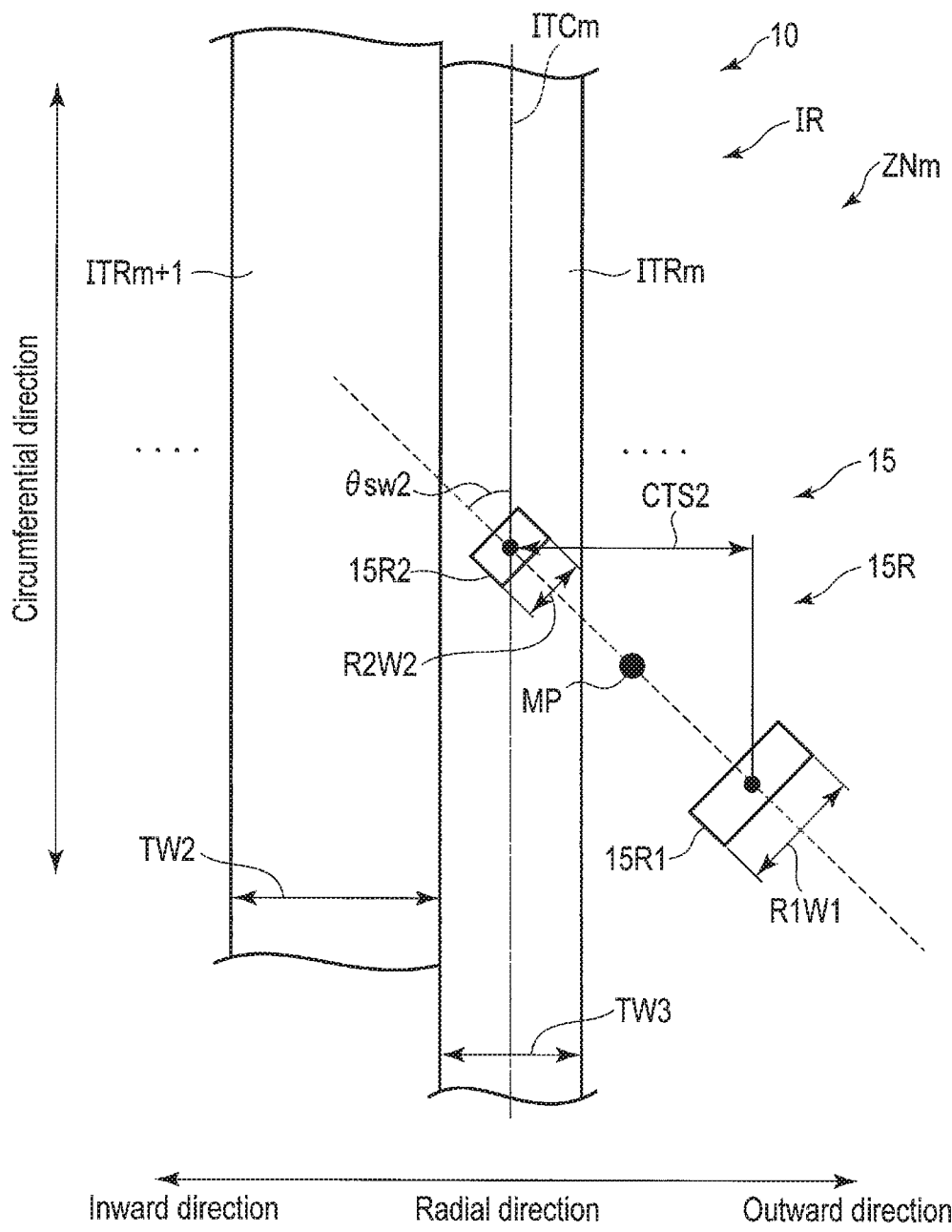
F I G. 13

MAGNETIC DISK DEVICE AND READ PROCESSING METHOD

CROSS-REFERENCE TO RELATED APPLICATIONS

This application is based upon and claims the benefit of priority from Japanese Patent Application No. 2019-016893, filed Feb. 1, 2019, the entire contents of which are incorporated herein by reference.

FIELD

Embodiments described herein relate generally to a magnetic disk device and a read processing method.

BACKGROUND

In recent years, two-dimensional magnetic recording (TDMR)-type magnetic disk devices having a head including a plurality of read heads have been developed. In the TDMR-type magnetic disk devices, the interval (cross track separation: CTS) in a direction intersecting tracks of a plurality of read heads changes according to skew angles of the heads. Therefore, in the TDMR-type magnetic disk devices, it is necessary to appropriately position the heads so as to read data written to the disk.

BRIEF DESCRIPTION OF THE DRAWINGS

FIG. 1 is a block diagram illustrating a configuration of a magnetic disk device according to a first embodiment.

FIG. 6 is a diagram illustrating an example of a relationship between an offset amount of a read head in a radial direction with respect to a middle portion when a head is positioned at a target track located in a particular region of a disk in which cross track separation is equal to or less than a particular value and an error rate when the head is positioned at the target track and the target track is read.

FIG. 12 is a flowchart illustrating an example of read processing according to the first embodiment.

FIG. 13 is a diagram illustrating an example of the arrangement of a read head according to a second embodiment.

DETAILED DESCRIPTION

Figure 2:
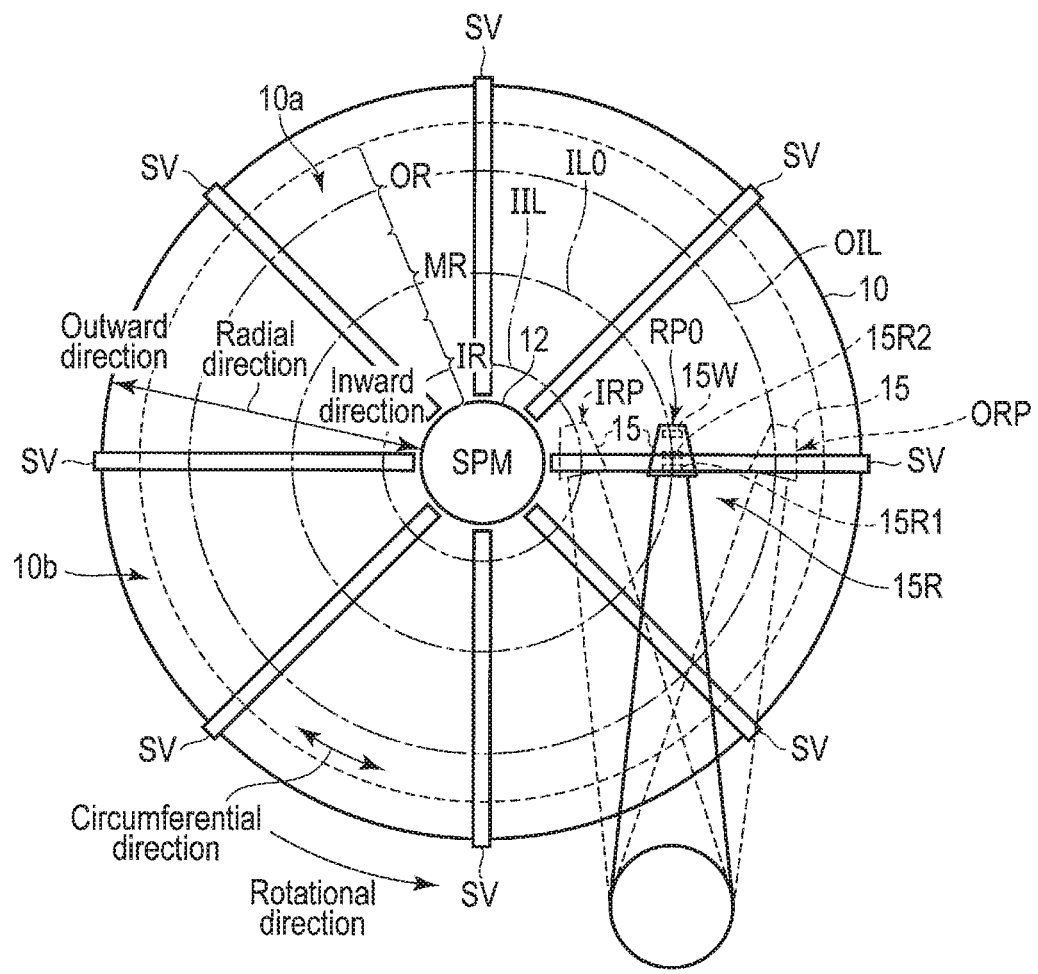
FIG. 2 is a schematic diagram illustrating an example of the arrangement of heads with respect, to a disk according to the first embodiment.

In general, according to one embodiment, a magnetic disk device comprises: a disk; a head comprising a write head that writes data to the disk, and a first read head and a second read head that read data from the disk; and a controller that, in reading a first track of a first region of the disk, positions a middle portion of the first read head and the second read head at a first track center of the first track, and in reading a second track of a second region of the disk different from the first region, positions any one of the first read head and the second read head at a second track center of the second track.

Hereinafter, embodiments will be described with reference to the drawings. Note that the drawings are merely examples and do not limit the scope of the invention.

First Embodiment

FIG. 1 is a block diagram illustrating a configuration of a magnetic disk device 1 according to a first embodiment.

The magnetic disk device 1 includes a head disk assembly (HDA) described later, a driver IC 20, a head amplifier integrated circuit (hereinafter referred to as a head amplifier IC or a preamplifier) 30, a volatile memory 70, a buffer memory (buffer) 80, a nonvolatile memory 90, and a system controller 130 that is a 1-channel integrated circuit. In addition, the magnetic disk device 1 is connected to a host system (host) 100. The magnetic disk device 1 is, for example, a magnetic disk device using a two-dimensional magnetic recording (TDMR) scheme.

The HDA includes a magnetic disk (hereinafter referred to as a disk) 10, a spindle motor (SPM) 12, an arm 13 on which a head 15 is mounted, and a voice coil motor (VCM) 14. The disk 10 is attached to the spindle motor 12 and is rotated by the driving of the spindle motor 12. The arm 13 and the VCM 14 constitute an actuator. The actuator performs movement control such that the head 15 mounted on the arm 13 is moved to a particular position of the disk 10 by driving the VCM 14. The disk 10 and the head 15 may be provided in two or more numbers. Hereinafter, data transferred from each unit of the magnetic disk device 1 or an external device, for example, the host 100, and written to the disk 10 may be referred to as write data, and data read from each unit of the magnetic disk device 1 or an external device, for example, the disk 10 transferred to the host 100 may be referred to as read data.

In the disk 10, a user data area 10a available from a user and a system area 10b for writing information necessary for system management are allocated in the recording area of the disk 10. Hereinafter, a circumferential direction of the disk 10, that is, a direction along a particular track of the disk 10 is referred to as a circumferential direction, and a direction intersecting the circumferential direction is referred to as a radial direction. Hereinafter, a particular circumferential position of the disk 10 is referred to as a circumferential position, and a particular radial position of the disk 10 is referred to as a radial position. In addition, data written to the tracks of the disk 10, the particular radial position of the disk 10, the central position (hereinafter referred to as track center) of the radial width (hereinafter simply referred to as track width) of the particular track of the disk 10, the particular radial position within the track width of the particular track of the disk 10, and the like may be simply referred to as track.

The head 15 includes a slider as a main body, and includes a write head 15W and a read head 15R chat are mounted on the slider. The write head 15W writes data to the disk 10. The read head 15R reads data recorded on the disk 10. The read head 15R includes a plurality of read heads, for example, two read heads 15R1 and 15R2. The read head 15R1 is provided at, for example, a position separated farthest from the write head 15W. The read head 15R2 is provided at, for example, a position separated from the write head 15W next to the read head 15R1. In other words, the read head 15R2 is located between the write head 15W and the read head 15R1. Note that the read head 15R may include three or more read heads. Hereinafter, a plurality of read heads, for example, two read heads 15R1 and 15R2 may be collectively referred to as a read head 15R, and a plurality of read heads, for example, one of the read heads 15R1 and 15R2 may be simply referred to as a read head 15R.

FIG. 2 is a schematic diagram illustrating an example of the arrangement of the head 15 with respect to the disk 10 according to the present embodiment. As illustrated in FIG. 2, the direction toward the outer circumference of the disk 10 in the radial direction is referred to as an outward direction (outward), and the direction opposite to the outward direction is referred to as an inward direction (inward). In addition, as illustrated in FIG. 2, in the circumferential direction, the direction in which the disk 10 rotates is referred to as a rotational direction. Note that, in the example illustrated in FIG. 2, although the rotational direction is illustrated as clockwise, it may be a reverse direction (counterclockwise). In FIG. 2, the user data area 10*a* is divided into an inner circumferential region IR located in the inward direction, an outer circumferential region OR located in the outward direction, and a middle circumferential region MR located between the inner circumferential region IR and the outer circumferential region OR. In the example illustrated in FIG. 2, a radial position IRP, a radial position RP0, and a radial position ORP are illustrated. The radial position IRP is a position in the inward direction from the radial position RP0, and the radial position ORP is a position in the outward direction from the radial position RP0. In the example illustrated in FIG. 2, the radial position RP0 is included in the middle circumferential region MR, the radial position ORP is included in the outer circumferential region OR, and the radial position IRP is included in the inner circumferential region IR. Note that the radial position RP0 may be included in the outer circumferential region OR, or may be included in the inner circumferential region IR. The radial positions IRP and ORP may each be included in the middle circumferential region MR. In FIG. 2, the radial position IRP corresponds to a track center IIL of a particular track in the inner circumferential region IR, the radial position RP0 corresponds to a track center IL0 of a particular track in the middle circumferential region MR, and the radial position ORP corresponds to a track center OIL of a particular track in the outer circumferential region OR. The track center IIL corresponds to a target track or path (hereinafter, it may be referred to as a target track or a target path) of the head 15 in a particular track, for example, a particular track in the inner circumferential region IR. The track center IL0 corresponds to a target track of the head 15 in a particular track, for example, a particular track in the middle circumferential region MR. The track center OIL corresponds to a target track of the head 15 in a particular track, for example, a particular track in the outer circumferential region OR. The track centers IIL, IL0, and OIL are concentrically located with respect to the disk 10. For example, the track centers IIL, IL0, and OIL are located in a perfect circular shape. Note that the track centers IIL, IL0, and OIL may not be circular, and may be located in a wave shape that changes in the radial direction of the disk 10.

The disk 10 has a plurality of servo patterns SV. Hereinafter, the servo patterns SV may be referred to as servo sectors or servo regions. The servo patterns SV extend radially in the radial direction of the disk 10 and are discretely arranged at particular intervals in the circumferential direction. The servo patterns SV include servo data and the like for positioning the head 15 at a particular radial position of the disk 10. Hereinafter, data other than servo data written to the user data area 10*a* other than the servo sectors SV may be referred to as user data.

The servo data includes, for example, servo marks, address data, and burst data. The address data includes an address (cylinder address) of a particular track and an address of a servo sector of the particular track. The burst data is data (relative position data) used to detect a radial position deviation (positional error) of the head 15 with respect to a track center of a particular track, and includes a repetitive pattern of a particular cycle. The burst data is, for example, written in a zigzag form across a track adjacent to a particular track in the radial direction of the track.

When the head 15 is located at the radial position RP0, the skew angle is, for example, 0°. Hereinafter, the radial position RP0 may be referred to as a reference position RP0. When the head 15 is located at the radial position ORP, the skew angle is, for example, a positive value. As the head 15 moves outward from the reference position RP0 in the radial direction, the skew angle increases with a positive value. When the head 15 is located at the radial position IRP, the skew angle is, for example, a negative value. As the head 15 moves inward from the reference position RP0 in the radial direction, the skew angle decreases with a negative value. Note that, when the head 15 is located at the radial position ORP, the skew angle may be a negative value. In addition, when the head 15 is located at the radial position IRP, the skew angle may have a positive value.

Figure 3:
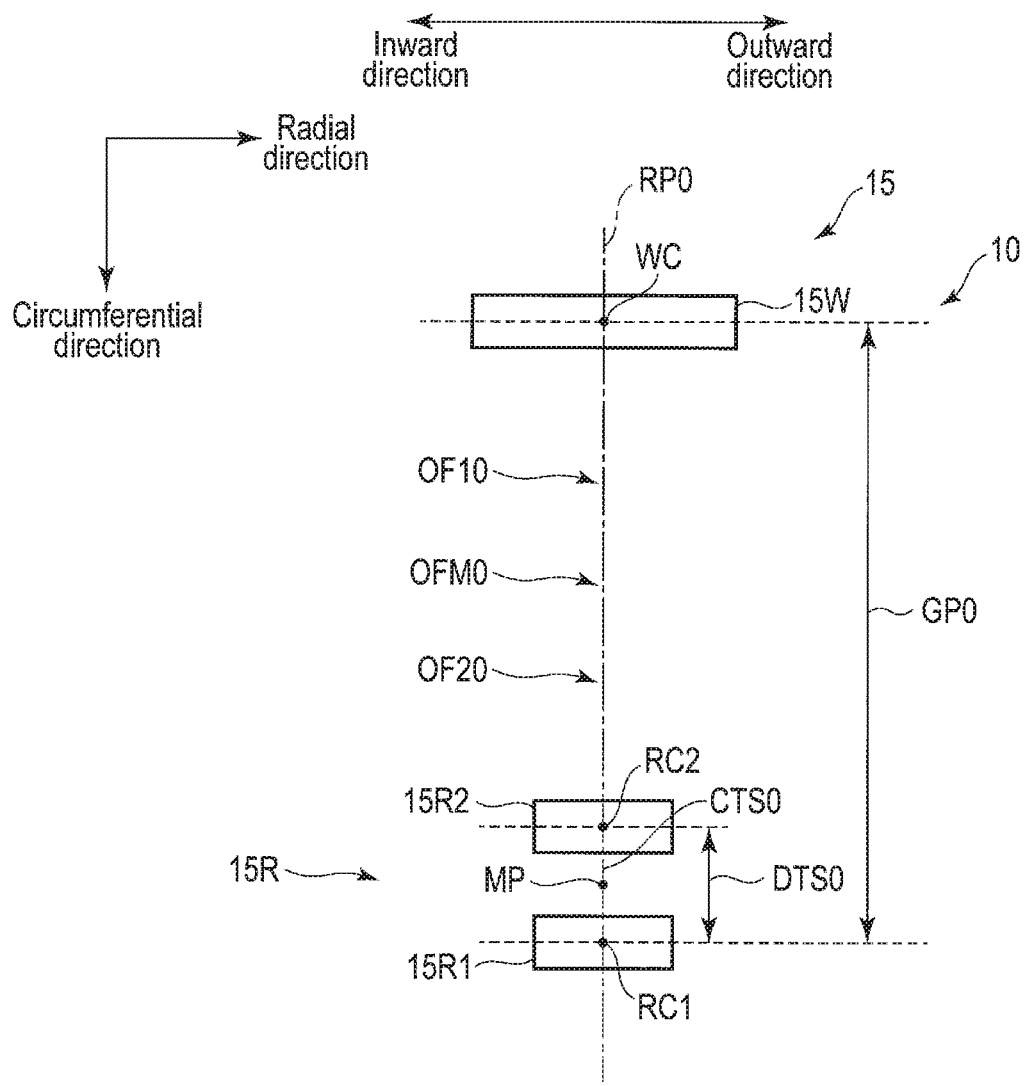
FIG. 3 is a schematic diagram illustrating an example of the geometric arrangement of a write head and two read heads when a read head is positioned at a reference position.

FIG. 3 is a schematic diagram illustrating an example of the geometric arrangement of the write head 15W and two read heads 15R1 and 15R2 when the read head 15R1 is positioned at the reference position RP0. Hereinafter, the geometric arrangement of the write head 15W and the two read heads 15R1 and 15R2 in the head 15 with reference to the position of the read head 15R1 will be described. FIG. 3 illustrates a central portion WC of the write head 15W, a central portion RC1 of the read head 15R1, a central portion RC2 of the read head 15R2, and a middle portion MP located in the middle of the central portion RC1 of the read head 15R1 and the central portion RC2 of the read head 15R2. Hereinafter, the circumferential interval between the central portion RC1 of the read head 15R1 and the central portion RC2 of the read head 15R2 may be referred to as down track separation (DTS). The radial interval between the central portion RC1 of the read head 15R1 and the central portion RC2 of the read head 15R2 may be referred to as cross track separation (CTS) or head interval. The radial interval between the read head 15R and the write head 15W, for example, the radial interval between the central portions RC1 and RC2 of the read heads 15R1 and 15R2 and the write head 15W and the radial interval between the middle portion MP and the write head 15W may be referred to as read/write offset. Hereinafter, for convenience of explanation, the "central portion of the write head" and "each unit of the write head" will be simply referred to as the "write head", and the "central portion of the read head", the "middle portion of two read heads among the plurality of read heads", and "each unit of the read head" may be simply referred to as the "read head".

In the example illustrated in FIG. 3, when the read head 15R1 is disposed at the reference position RP0, the write head 15W, the read head 15R1, the read head 15R2, and the middle portion MP are aligned along the circumferential direction. In this case, the read head 15R1 and the read head 15R2 are not deviated in the radial direction. That is, the cross track separation CTS0 when the read head 15R1 is disposed at the reference position RP0 is 0. In addition, when the read head 15R1 is disposed at the reference position RP0, the read head 15R1 and the write head 15W, the read head 15R2 and the write head 15W, and the middle portion MP and the write head 15W are not deviated in the radial direction. That is, in this case, the read/write offset OF10 of the read head 15R1 and the write head 15W, the read/write offset OF20 of the read head 15R2 and the write head 15W, and the middle portion MP and the write head 15W are 0. Note that, when the read head 15R1 is disposed at the reference position RP0, the read head 15R1 and the read head 15R2 may be deviated in the radial direction. In addition, when the read head 15R1 is disposed at the reference position RP0, the write head 15W and the read heads 15R1 and 15R2 may be deviated in the radial direction.

In the example illustrated in FIG. 3, when the read head 15R1 is disposed at the reference position RP0, the write head 15W and the read head 15R1 are separated by a gap GP0 in the circumferential direction. When the read head 15R1 is disposed at the reference position RP0, the read head 15R1 and the read head 15R2 are separated in the circumferential direction by the down track separation DTS0.

Figure 4:
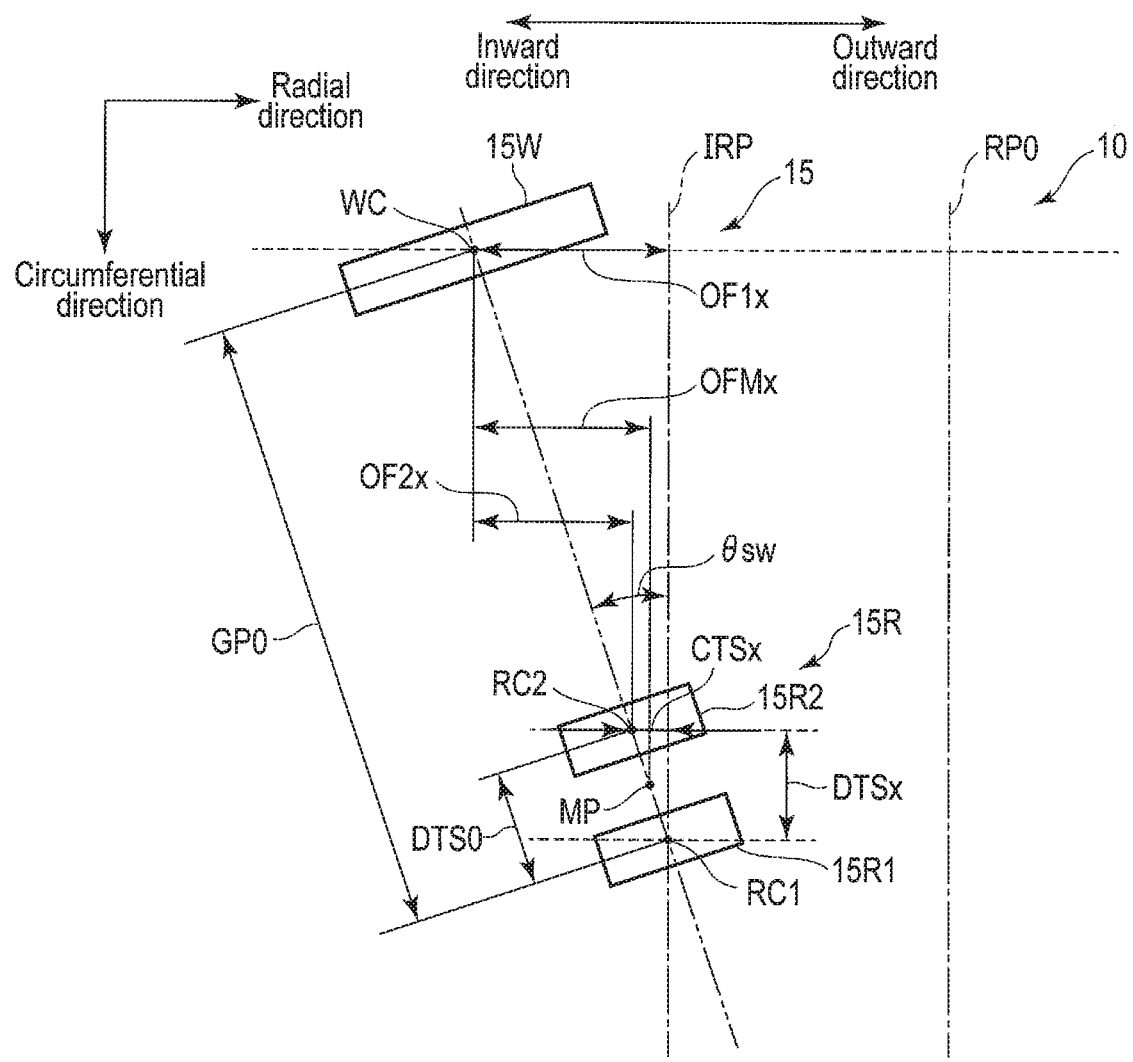
FIG. 4 is a diagram illustrating an example of the geometric arrangement of a write head and two read heads when a read head is positioned at a radial position.

FIG. 4 is a diagram illustrating an example of the geometric arrangement of the write head 15W and two read heads 15R1 and 15R2 when the read head 15R1 is positioned at the radial position IRP.

In the example illustrated in FIG. 4, when the read head 15R1 is disposed at the radial position IRP, the write head 15W, the read head 15R1, the read head 15R2, and the middle portion MP (head 15) are inclined in the inward direction at a skew angle θsw with respect to the circumferential direction. An absolute value of the skew angle θsw increases as the head 15 moves away inward from the reference position RP0 in the radial direction. When the head 15 is inclined inward at the skew angle θsw with respect to the circumferential direction, the read head 15R1 and the read head 15R2 are separated in the radial direction by the cross track separation CTSx. As the head 15 moves away inward from the reference position RP0 in the radial direction, an absolute value of the cross track separation CTSx increases. In other words, as the absolute value of the skew angle θsw increases, the absolute value of the cross track separation CTSx also increases. When the read head 15R1 is disposed at the radial position IRP, the read head 15R1 and the write head 15W are separated in the radial direction by the read/write offset OF1x. As the head 15 moves away inward from the reference position RP0 in the radial direction, the absolute value of the read/write offset OF1x increases. In other words, as the absolute value of the skew angle θsw increases, the absolute value of the read/write offset OF1x also increases. When the read head 15R1 is disposed at the radial position IRP, the read head 15R2 and the write head 15W are separated in the radial direction by the read/write offset OF2x. As the head 15 moves away inward from the reference position RP0 in the radial direction, the absolute value of the read/write offset OF2x increases. In other words, as the absolute value of the skew angle θsw increases, the absolute value of the read/write offset OF2x also increases. When the read head 15R1 is disposed at the radial position IRP, the middle portion MP and the write head 15W are separated in the radial direction by the read/write offset OFMx. As the head 15 moves away inward from the reference position RP0 in the radial direction, the absolute value of the read/write offset OFMx increases. In other words, as the absolute value of the skew angle θsw increases, the absolute value of the read/write offset OFMx also increases.

In the example illustrated in FIG. 4, when the read head 15R1 is disposed at the radial position IRP, the read head 15R1 and the read head 15R2 are separated in the circumferential direction by the down track separation DTSx. As the head 15 moves away inward from the reference position RP0 in the radial direction, the down track separation DTSx decreases. In other words, as the absolute value of the skew angle θsw increases, the down track separation DTSx also decreases.

Note that, even when the read head 15R1 is disposed at the radial position ORP, as in the case where the read head 15R1 is positioned at the radial position IRP, the write head 15W, the read heads 15R1 and 15R2, and the middle portion MP are inclined in the outward direction at a particular skew angle. When the read head 15R1 is disposed at the radial position ORP, the read head 15R1 and the read head 15R2 can be separated in the circumferential direction by a particular down track separation DTSx. An absolute value of the skew angle θsw increases as the head 15 moves away outward from the reference position RP0 in the radial direction. When the head 15 is inclined outward at the skew angle θsw with respect to the circumferential direction, the read head 15R1 and the read head 15R2 are separated in the outward direction by the cross track separation CTSx. As the head 15 moves away outward from the reference position RP0 in the radial direction, the absolute value of the cross track separation CTSx increases.

The driver IC 20 controls the driving of the SPM 12 and the VCM 14 according to the control of the system controller 130 (specifically, the MPU 60 described later).

The head amplifier IC (preamplifier) 30 includes a read amplifier and a write driver. The read amplifier amplifies a read signal read from the disk 10 and outputs the amplified read signal to the system controller 130 (specifically, the read/write (R/W) channel 50 described later). The write driver outputs, to the head 15, a write current corresponding to the write data output from the R/W channel 50.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The buffer memory 80 is a semiconductor memory that temporarily records data and the like transmitted and received between the magnetic disk device 1 and the host 100. Note that the buffer memory 80 may be integrated with the volatile memory 70. The buffer memory 80 is, for example, a DRAM, a static random access memory (SRAM), an SDRAM, a ferroelectric random access memory (FeRAM), and a magnetoresistive random access memory (MRAM).

The nonvolatile memory 90 is a semiconductor memory that records stored data even when power supply is cut off. The nonvolatile memory 90 is, for example, a NOR-type or NAND-type flash read only memory (FROM).

The system controller (controller) 130 is realized by, for example, using a large scale integrated circuit (LSI) called a system-on-a-chip (SoC) in which a plurality of elements are integrated on a single chip. The system controller 130 includes a hard disk controller (HDC) 40, a read/write (R/W) channel 50, and a microprocessor (MPU) 60. The HDC 40, the R/W channel 50, and the MPU 60 are electrically connected to one another. The system controller 130 is electrically connected to, for example, the driver IC 20, the head amplifier IC 60, the volatile memory 70, the buffer memory 80, the nonvolatile memory 90, the host system 100, and the like.

The HDC 40 controls data transfer between the host 100 and the R/W channel 50 in response to an instruction from the MPU 60 described later. The HDC 40 is electrically connected to, for example, the volatile memory 70, the buffer memory 80, and the nonvolatile memory 90.

The R/W channel 50 performs signal processing of read data and write data in response to an instruction from the MPU 60. The R/W channel 50 has a circuit or function that measures the signal quality of the read data. The R/W channel 50 is electrically connected to, for example, the head amplifier IC 30.

The MPU 60 is a main controller that controls each unit of the magnetic disk device 1. The MPU 60 controls the VCM 14 through the driver IC 20 and performs positioning of the head 15. The MPU 60 controls the operation of writing data to the disk 10 and selects the storage destination of the write data transferred from the host 100. In addition, the MPU 60 controls the operation of reading data from the disk 10 and controls the processing of read data transferred from the disk 10 to the host 100. The MPU 60 is connected to each unit of the magnetic disk device 1. The MPU 60 is electrically connected to, for example, the driver IC 20, the HDC 40, and the R/W channel 50. The "positioning of the head 15" includes the "positioning (arranging) of the read heads 15R1 and 15R2 and the middle portion MP (read head 15R) at a particular position of the disk 10" and the "positioning (arranging) of the write head 15W at a particular position of the disk 10".

Figure 5:
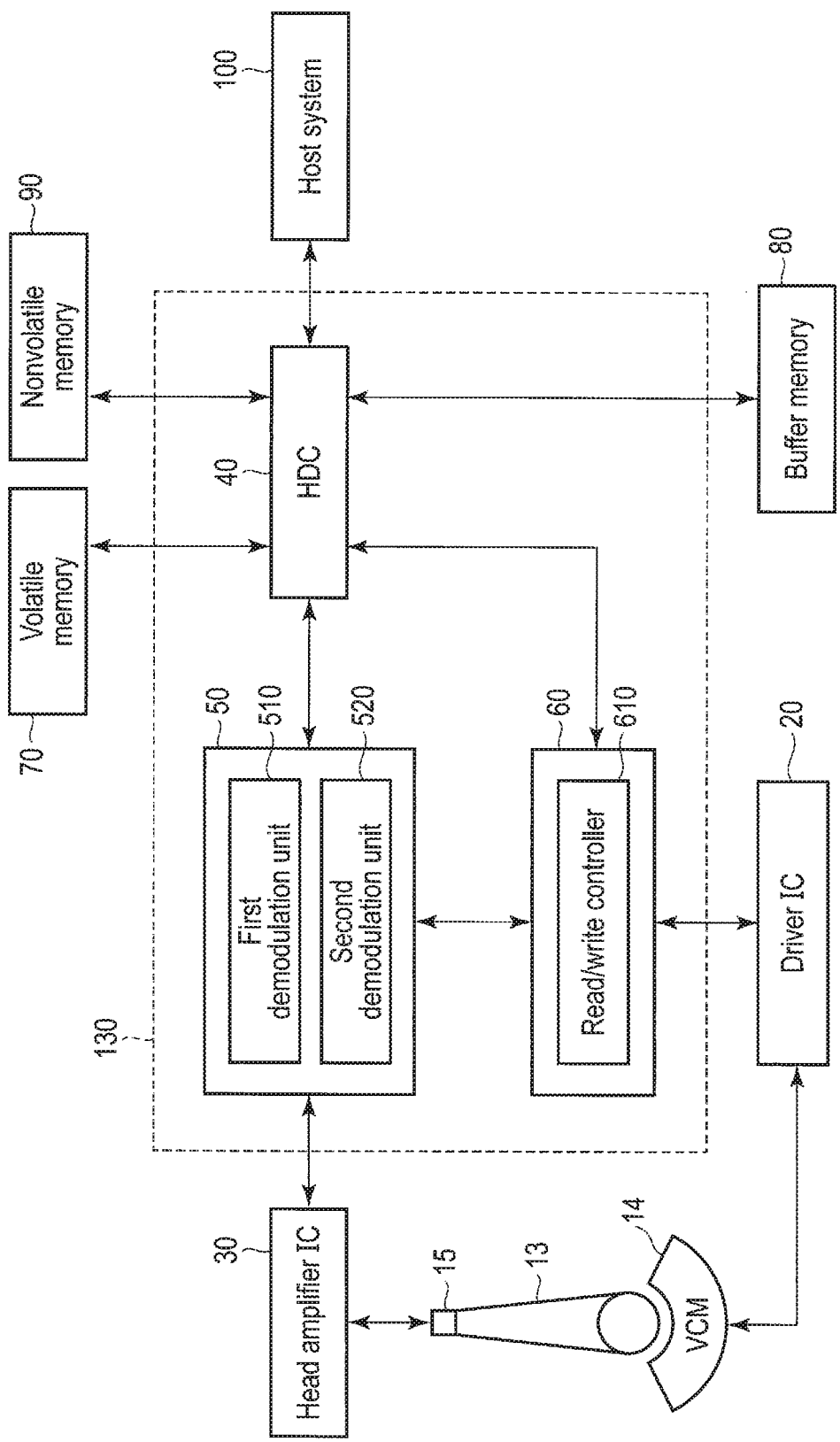
FIG. 5 is a block diagram illustrating a configuration example of an R/W channel 50 and an MPU 60 according to the first embodiment.

FIG. 5 is a block diagram illustrating the configuration example of the R/W channel 50 and the MPU 60 according to the present embodiment. In FIG. 5, the disk 10 and the like are omitted.

The R/W channel 50 includes a first demodulation unit 510 and a second demodulation unit 520. For example, the first demodulation unit 510 demodulates the data read by the read head 15R1, for example, the servo signal, and outputs the demodulated servo data to the MPU 60 and the like. As with the first demodulation unit 510, the second demodulation unit 520 demodulates the servo signal read by the read head 15R2 and outputs the demodulated servo data to the MPU 60 and the like. Note that, when three or more read heads are provided, the R/W channel 50 may include three or more demodulators respectively corresponding to these read heads.

The MPU 60 includes a read/write controller 610. The MPU 60 performs processing of each unit, such as the read/write controller 610, on firmware. Note that the MPU 60 may include each unit as a circuit.

The read/write controller 610 controls data read processing and write processing according to a command from the host 100. The read/write controller 610 controls the VCM 14 through the driver IC 20, positions the head 15 at a particular radial position on the disk 10, and performs read processing or write processing.

The read/write controller 610 performs read processing with the plurality of read heads, for example, at least one (read head 15R) of the read heads 15R1 and 15R2. For example, the read/write controller 610 positions the read head 15R1 at a track center of a particular track and reads the track by the read heads 15R1 and 15R2. The read/write controller 610 positions the read head 15R2 at a track center of a particular track and reads the track by the read heads 15R1 and 15R2. In addition, the read/write controller 610 positions the middle portion MP at a track center of a particular track and reads the track by the read heads 15R1 and 15R2. Hereinafter, "positioning the read head 15R1 at (a track center of) a particular track and reading the track by the read heads 15R1 and 15R2" or "arranging the read head 15R1 at (a track center of) a particular track" may be described as "positioning the read head 15R1 at a particular track". "Positioning the read head 15R2 at (a track center of) a particular track and reading the track by the read heads 15R1 and 15R2" or "arranging the read head 15R2 at (a track center of) a particular track" may be described as "positioning the read head 15R2 at a particular track". In addition, "positioning the middle portion MP at (a track center of) a particular track and reading the track by the read heads 15R1 and 15R2" or "arranging the middle portion MP at (a track center of) a particular track" may be described as "positioning the middle portion MP at a particular track".

The read/write controller 610 positions the read head with the smallest error rate (bit error rate) in the read head 15R at the target track, based on cross track separation when the head 15, for example, the middle portion MP is positioned at the target radial position (hereinafter referred to as the target position) instructed by a command or the like from the host 100, for example, the target track (hereinafter referred to as the target track) instructed by a command or the like from the host 100. Note that the read/write controller 610 positions a read head (hereinafter also referred to as an initial read head) with the smallest error rate in the read head 15R on the target track, based on the skew angle when the head 15 is positioned at the target track, the radial position of the target track, or the particular region of the disk 10 including the target track, for example, the zone. The zone corresponds to, for example, one of a plurality of regions obtained by dividing the user data area 10a of the disk 10 in the radial direction. In addition, the zone includes at least one track. When it is determined that the target track cannot be read in a state in which the target track is positioned at the target track, for example, the initial read head within the read head 15R by High Fly Write or the like, the read/write controller 610 positions, at the target track, at least one particular read head (hereinafter also referred to as a modified read head) different from the initial read head among the read heads 15R. For example, when at least one (or more) read retry is performed in a state in which the initial read head is positioned at the target track, or when the read retry is repeatedly performed in a state in which the initial read head is positioned at the target track, the read/write controller 610 positions at least one modified read head at the target track. Note that the error rate when the initial read head is positioned at the particular track and the particular track is read and the error rate when the modified read head is positioned at the particular track and the particular track is read may be identical to or different from each other. In other words, the modified read head may or may not include the read head with the smallest error rate among the read heads 15R. For example, when the plurality of different modified read heads are positioned at the target track, respectively, the read/write controller 610 outputs the read data with the smallest error rate to each unit, for example, each unit of the magnetic disk device 1 and the host 100 among the plurality of read data acquired by positioning the plurality of modified read heads at the target track, respectively. Note that, when the error rate is the same among the plurality of read data acquired by positioning the plurality of modified read heads at the target track, respectively, the read/write controller 610 may select at least one read data among the plurality of read data and may output the selected data to each unit, for example, each unit of the magnetic disk device 1 and the host 100 or the like.

When it is determined that the cross track separation when the middle portion MP is positioned at the target track is equal to or less than a particular value, for example, the track width (or the track pitch) of the target track, the read/write controller 610 positions the middle portion MP at the target track. When it is determined that the target track cannot be read in a state in which the middle portion MP is positioned at the target track, the read/write controller 610 positions the read head 15R1 (or the read head 15R2) at the target track, and positions the read head 15R2 (or the read head 15R1) at the target track after the read head 15R1 (or the read head 15R2) is positioned at the target track. For example, the read/write controller 610 outputs the read data with the smaller error rate among the read data acquired by positioning the read head 15R1 at the target track and the read data acquired by positioning the read head 15R2 at the target track.

When it is determined that the cross track separation when the middle portion MP is positioned at the target track is larger than a particular value, for example, the track width (or the track pitch) of the target track, the read/write controller 610 positions the read head 15R1 (or the read head 15R2) at the target track. When it is determined that reading cannot be performed in a state in which the read head 15R1 (or the read head 15R2) is positioned at the target track, the read/write controller 610 positions the read head 15R2 (or the read head 15R1) at the target track. Note that, when it is determined that the cross track separation when the middle portion MP is positioned at the target track is larger than a particular value, for example, the track width (or the track pitch) of the target track, the read/write controller 610 may position the middle portion MP at the target track.

When it is determined that the skew angle when the middle portion MP is positioned at the target track is a skew angle having cross track separation smaller than a particular value, for example, the track width (or the track pitch) of the target track, the read/write controller 610 determines that the cross track separation is equal to or less than the track width of the target track, and positions the middle portion MP at the target track. When it is determined that reading cannot be performed in a state in which the middle portion MP is positioned at the target track, the read/write controller 610 positions the read head 15R1 (or the read head 15R2) at the target track, and positions the read head 15R2 (or the read head 15R1) at the target track after positioning the read head 15R1 (or the read head 15R2) at the target track. For example, the read/write controller 610 outputs the read data with the smaller error rate among the read data acquired by positioning the read head 15R1 at the target track and the read data acquired by positioning the read head 15R2 at the target track.

When it is determined that the skew angle when the middle portion MP is positioned at the target track is a skew angle having cross track separation larger than a particular value, for example, the track width (or the track pitch) of the target track, the read/write controller 610 determines that the cross track separation is larger than the track width of the target track, and positions the read head 15R1 (or the read head 15R2) at the target track. When it is determined that reading cannot be performed in a state in which the read head 15R1 (or the read head 15R2) is positioned at the target track, the read/write controller 610 positions the read head 15R2 (or the read head 15R1) at the target track. Note that, when it is determined that the skew angle when the middle portion MP is positioned at the target track is a skew angle having cross track separation larger than a particular value, for example, the track width (or the track pitch) of the target track, the read/write controller 610 determines that the cross track separation is larger than the track width of the target track, and positions the middle portion MP at the target track.

When it is determined that the radial position of the target track is a radial position having cross track separation smaller than a particular value, for example, the track width (or the track pitch) of the target track in positioning the middle portion MP, the read/write controller 610 determines that the cross track separation is equal to or less than the track width of the target track, and positions the middle portion MP at the target track. When it is determined that the target track cannot be read in a state in which the middle portion MP is positioned at the target track, the read/write controller 610 positions the read head 15R1 (or the read head 15R2) at the target track, and positions the read head 15R2 (or the read head 15R1) at the target track after the read head 15R1 (or the read head 15R2) is positioned at the target track. For example, the read/write controller 610 outputs the read data with the smaller error rate among the read data acquired by positioning the read head 15R1 at the target track and the read data acquired by positioning the read head 15R2 at the target track.

When it is determined that the radial position of the target track is a radial position having cross track separation larger than a particular value, for example, the track width (or the track pitch) of the target track in positioning the middle portion MP, the read/write controller 610 determines that the cross track separation is larger than the track width of the target track, and positions the read head 15R1 (or the read head 15R2) at the target track. When it is determined that the target track cannot be read by the read head 15R1 (or the read head 15R2), the read/write controller 610 positions the read head 15R2 (or the read head 15R1) at the target track. Note that, when it is determined that the radial position of the target track is a radial position having cross track separation larger than a particular value, for example, the track width of the target track in positioning the middle portion MP, the read/write controller 610 determines that the cross track separation is larger than the track width of the target track, and positions the middle portion MP at the target track.

When it is determined that the zone including the target track is a zone having cross track separation equal to or less than a particular value, for example, the track width (or track pitch) of the target track, the read/write controller 610 determines that the cross track separation is equal to or less than the track width of the target track, and positions the middle portion MP at the target track. When it is determined that the target track cannot be read in a state in which the middle portion MP is positioned at the target track, the read/write controller 610 positions the read head 15R1 (or read head 15R2) at the target track, and positions the read head 15R2 (or read head 15R1) at the target track after the read head 15R1 (or read head 15R2) is positioned at the target track. For example, the read/write controller 610 outputs the read data with the smaller error rate among the read data acquired by positioning the read head 15R1 at the target track and the read data acquired by positioning the read head 15R2 at the target track.

When it is determined that the zone including the target track is a zone having cross track separation larger than a particular value, for example, the track width (or track pitch) of the target track, the read/write controller 610 determines that the cross track separation is larger than the track width of the target track, and positions the read head 15R1 (or the read head 15R2) at the target track. When it is determined that the target track cannot be read in a state in which the read head 15R1 (or the read head 15R2) is positioned at the target track, the read/write controller 610 positions the read head 15R2 (or the read head 15R1) at the target track. Note that, when it is determined that the zone including the target track is a zone having cross track separation larger than a particular value, for example, the track width of the target track, the read/write controller 610 determines that the cross track interval is larger than the track width of the target track, and positions the middle portion MP at the target track.

For example, in the manufacturing process or the like, the read/write controller 610 measures the cross track separation and the skew angle when the head 15 is positioned at each radial position of the disk 10, and the error rate when the data is read by the read head 15R at each radial position of the disk 10. The read/write controller 610 sets the read head 15R (the initial read head) that minimizes the error rate corresponding to the measured cross track separation and skew angle. The read/write controller 610 records the measured cross track separation and skew angle, the zone corresponding to the measured cross track separation and skew angle, and the read head 15R (the initial read head) that minimizes the error rate corresponding to the set cross track separation and skew angle in association with each other in the memory, for example, the nonvolatile memory 90, the buffer memory 80, the volatile memory 70, and the disk 10.

FIG. 6 is a diagram illustrating an example of the relationship between an offset amount of the read head 15R in the radial direction with respect to the middle portion MP when the head 15 is positioned at the target track located in a particular region of the disk 10 in which cross track separation is equal to or less than a particular value and the error rate when the head 15 is positioned at the target track and the target track is read.

FIG. 6 illustrates the relationship between the offset amount of the read head 15R in the radial direction with respect to the middle portion MP (also simply referred to as the offset amount) in positioning the head 15 at the target track located in the particular region (hereinafter simply referred to as a narrow region) obtained by dividing the user data area 10*a* of the disk 10 in which the cross track separation is equal to or less than a particular value, for example, the track width (or the track pitch) in the radial direction, for example, the middle circumferential region (hereinafter simply referred to as the middle circumferential region) MR including the reference position RP0, and the error rate when the head 15 is positioned at the target track.

Note that the narrow region may be, for example, a region in which the cross track separation is 0.7 to 1.3 times as large as the track width (or the track pitch). The narrow region may be, for example, a region in which the cross track separation is less than 0.7 times as large as the track width (or the track pitch), and may be a region in which the cross track separation is greater than 1.3 times as large as the track width (or the track pitch). The narrow region is a region in which (the absolute value of) the skew angle of the head 15 is equal to or less than a particular angle (hereinafter also referred to as an angle threshold). In addition, the inner circumferential region IF or the outer circumferential region OR may be the narrow region.

In FIG. 6, a horizontal axis represents the offset amount of the read head 15R with respect to the middle portion MP when the head 15 is positioned at the target track located in the middle circumferential region MR, and a vertical axis represents the error rate when the head 15 is positioned at the target track located in the middle circumferential region MR. In the horizontal axis of FIG. 6, the offset amount increases in the direction of the positive value as it proceeds in the direction of the positive arrow from the offset amount=0 (middle portion MP), and the offset amount decreases in the direction of the negative value as it proceeds in the direction of the negative arrow from the offset value=0. For example, the direction of the positive value of the offset amount corresponds to the radially outward direction, and the direction of the negative value of the offset amount corresponds to the radially inward direction. Note that the direction of the positive value of the offset amount may correspond to the radially inward direction, and the direction of the negative value of the offset amount may correspond to the radial outward direction. In the vertical axis of FIG. 6, the error rate increases with the direction of the large arrow and decreases with the direction of the small arrow.

FIG. 6 illustrates the change R1E1 of the error rate with respect to the offset amount in the case of reading only by the read head 15R1 in a state in which the head 15 is positioned at the target track located in the middle circumferential region MR, for example, the middle portion MP is positioned at the target track, the change R2E1 of the error rate with respect to the offset amount in the case of reading only by the read head 15R2 in a state in which the head 15, for example, the middle portion MP is positioned at the target track located at the middle circumferential region MR, and the change MPE1 of the error rate with respect to the offset amount in the case of reading by two read heads 15R1 and 15R2 in a state in which the head 15, for example, the middle portion MP is positioned at the target track located in the middle circumferential region MR. The change MPE1 of the error rate corresponds to, for example, the change of the error rate obtained by combining the change R1E1 and R2E1 of the error rate, or the change of the error rate obtained by averaging the change R1E1 and R2E1 of the error rate.

In the example illustrated in FIG. 6, the change R1E1 of the error rate changes in a parabola (quadric curve) shape having a vertex R1V1. The change R1E1 of the error rate is the minimum value at the vertex R1V1. The vertex R1V1 corresponds to the offset amount in the direction of the positive value from the offset amount=0. In other words, the vertex R1V1 corresponds to the offset amount of the central portion RC1 of the read head 15R1 with respect to the offset amount=0. The change R2E1 of the error rate changes in a parabola shape having a vertex R2V1. In the example illustrated in FIG. 6, the change R2E1 of the error rate overlaps the change R1E1 of the error rate at the offset amount=0. The change R2E1 of the error rate is the minimum value at the vertex R2V1. The vertex R2V1 corresponds to the offset amount in the direction of the negative value from the offset amount=0. In other words, the vertex R1V1 corresponds to the offset amount of the central portion RC2 of the read head 15R2 with respect to the offset amount=0. In the example illustrated in FIG. 6, the vertex R2V1 is the same as the vertex R1V1. Note that the vertex R2V1 may be different from the vertex R1V1. The change MPE1 of the error rate changes in a parabola shape having a vertex MPV1. The change MPE1 of the error rate is the minimum value at the vertex MPV1. The vertex MPV1 corresponds to the offset amount=0 (middle portion MP). The vertex MPV1 is smaller than the vertices R1V1 and R2V1. Note that the vertex MPV1 may be the same as at least one of the vertices R1V1 and R2V1. FIG. 6 illustrates the cross track separation CTS1 between the vertices R1V1 and R2V1. The cross track separation CTS1 is equal to or less than the track width (or the track pitch) of the particular track located in the narrow region.

In the example illustrated in FIG. 6, the read/write controller 610 positions the middle portion MP at the target track so as to minimize the error rate based on the cross track separation CTS1. For example, in reading the target track located in the middle circumferential region in which the cross track separation is equal to or less than the track width (or the track pitch), the read/write controller 610 determines that the cross track separation CTS1 is equal to or less than the track width of the target track, and positions the middle portion MP at the target track so as to minimize the error rate.

Figure 7:
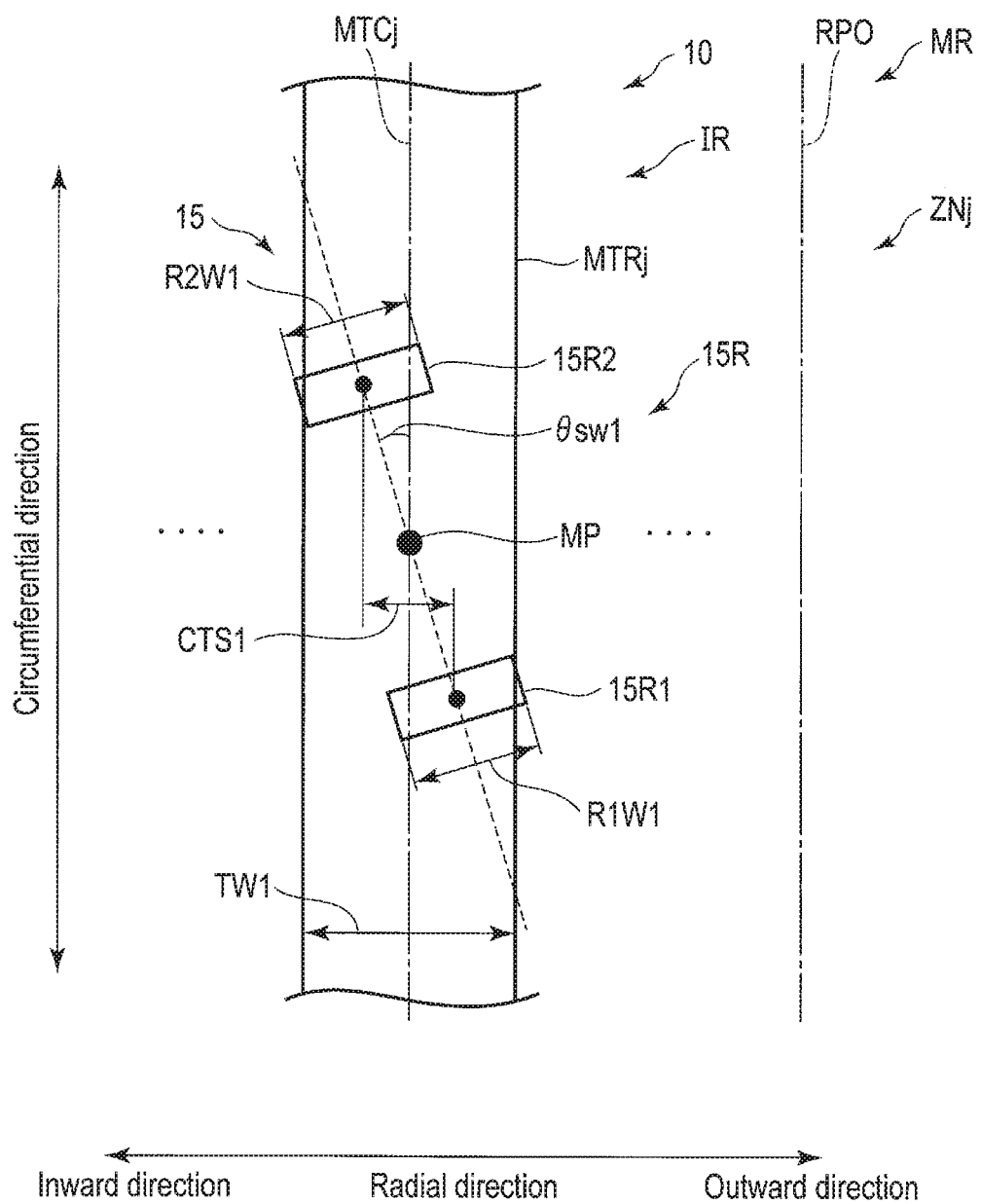
FIG. 7 is a diagram illustrating an example of the arrangement of the read head corresponding to FIG. 6.

FIG. 7 is a diagram illustrating an example of the arrangement of the read head 15R corresponding to FIG. 6. FIG. 7 illustrates only the configuration necessary for explanation. FIG. 7 illustrates the target track MTRj of the zone ZNj located in the inward direction from the reference position RP0 in the middle circumferential region MR. In the example illustrated in FIG. 7, the read head 15R1, the read head 15R2, and the middle portion MP are inclined inward at a skew angle θsw1 with respect to the circumferential direction. The read heads 15R1 and 15R2 are separated from each other by the cross track separation CTS1. The cross track separation CTS1 is smaller than the track width TW1 of the target track MTRj. The middle portion MP is located at the track center MTCj of the target track MTRj. The read heads 15R1 and 15R2 overlap the target track MTRj. For example, the width R1W1 of the read head 15R1 is identical to the width R2W1 of the read head 15R2. The width R1W1 of the read head 15R1 may be different from the width R2W1 of the read head 15R2.

In the example illustrated in FIG. 7, in reading the target track MTRj located in the middle circumferential region MR in which the cross track separation is smaller than the track width, the read/write controller 610 determines that the cross track separation CTS1 is equal to or less than the track width TW1 of the target track MTRj, and positions the middle portion MP at the track center MTCj of the target track MTRj. When it is determined that the target track MTRj cannot be read in a state in which the middle portion MP is positioned at the target track MTRj, the read/write controller 610 positions the read head 15R1 (or the read head 15R2) at the track center MTCj of the target track MTRj. After positioning the read head 15R1 (or the read head 15R2) at the target track MTRj, the read/write controller 610 positions the read head 15R2 (or the read head 15R1) at the track center MTCj of the target track MTRj.

Figure 8:
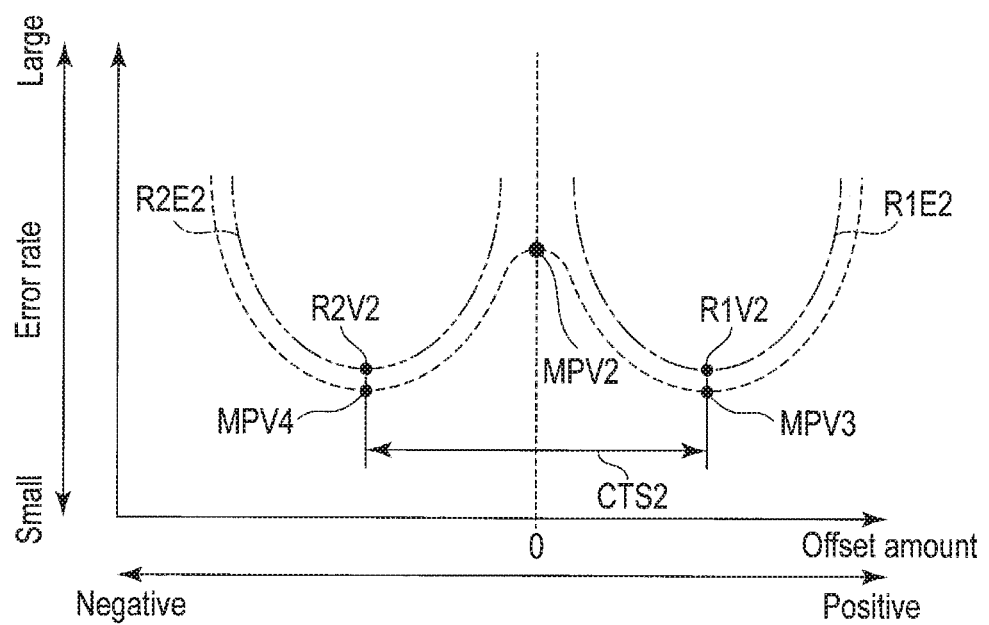
FIG. 8 is a diagram illustrating an example of a relationship between an offset amount of a read head in a radial direction with respect to a middle portion when a head is positioned at a target track located in a particular region of a disk in which cross track separation is larger than a particular value and an error rate when the head is positioned at the target track and the target track is read.

FIG. 8 is a diagram illustrating an example of the relationship between the offset amount of the read head 15R in the radial direction with respect to the middle portion MP when the head 15 is positioned at the target track located in a particular region of the disk 10 in which cross track separation is larger than a particular value and the error rate when the head 15 is positioned at the target track.

FIG. 8 illustrates an example of the relationship between the offset amount of the read head 15R with respect to the middle portion MP when the head 15 is positioned at the target track located in the inner circumferential region IR in the inward direction from the region of the disk 10 (hereinafter also referred to as the large region) in which the cross track separation is larger than a particular value, for example, the track width (or the track pitch), for example, the middle circumferential region MR, and the error rate when the head 15 is positioned at the target track. The large region is, for example, a region in which the cross track separation is larger than the narrow region when the head 15 is positioned. In other words, the large region is a region other than the narrow region of the user data area 10a. The outer circumferential region OR in the outward direction from the middle circumferential region MR can also be the large region. Therefore, the same description as the relationship between the offset amount and the error rate illustrated in FIG. 8 can be applied to the relationship between the offset amount of the read head 15R with respect to the middle portion MP when the head 15 is positioned at the target track located in the outer circumferential region OR in the outward direction from the middle circumferential region MR and the error rate when the head 15 is positioned at the target track. Note that the large region may be, for example, a region in which the cross track separation is larger than 0.7 times as large as the track width (or the track pitch). Note that the large region may be, for example, a region in which the cross track separation is equal to or less than 0.7 times as large as the track width (or the track pitch). The large region is a region in which (the absolute value of) the skew angle of the head 15 is larger than the angle threshold. In other words, the large region is a region in which (the absolute value of) the skew angle of the head 15 is larger than the narrow region. In addition, the middle circumferential region MR may be the large region.

In FIG. 8, a horizontal axis represents the offset amount of the read head 15R with respect to the middle portion MP when the head 15 is positioned at the target track located in the inner circumferential region IR, and a vertical axis represents the error rate when the head 15 is positioned at the target track located in the inner circumferential region IR. In the horizontal axis of FIG. 8, the offset amount increases in the direction of the positive value as it proceeds in the direction of the positive arrow from the offset amount=0 (middle portion MP), and the offset amount decreases in the direction of the negative value as it proceeds in the direction of the negative arrow from the offset value=0. In the vertical axis of FIG. 8, the error rate increases with the direction of the large arrow and decreases with the direction of the small arrow.

FIG. 8 illustrates the change R1E2 of the error rate with respect to the offset amount in the case of reading only by the read head 15R1 in a state in which the head 15, for example, the middle portion MP is positioned at the target track located in the inner circumferential region IR, the change R2E2 of the error rate with respect to the offset amount in the case of reading only by the read head 15R2 in a state in which the head 15, for example, the middle portion MP is positioned at the target track located at the inner circumferential region IR, and the change MPE2 of the error rate with respect to the offset amount in the case of reading by two read heads 15R1 and 15R2 in a state in which the head 15, for example, the middle portion MP is positioned at the target track located in the inner circumferential region IR. The change MPE2 of the error rate corresponds to, for example, the change of the error rate obtained by combining the change R1E2 and R2E2 of the error rate, or the change of the error rare obtained by averaging the change R1E2 and R2E2 of the error rate.

In the example illustrated in FIG. 8, the change R1E2 of the error rate changes in a parabola (quadric curve) shape having a vertex R1V2. The change R1E2 of the error rate is the minimum value at the vertex R1V2. The vertex R1V2 corresponds to the offset amount in the direction of the positive value from the offset amount=0. In other words, the vertex R1V2 corresponds to the offset amount of the central portion RC1 of the read head 15R1 with respect to the offset amount=0. The change R2E2 of the error rate changes in a parabola shape having a vertex R2V2. In the example illustrated in FIG. 8, the change R2E2 of the error rate is separated from the change R1E2 of the error rate, and does not overlap the change R1E2 of the error rate when the offset amount=0. The change R2E2 of the error rate is the minimum value at the vertex R2V2. The vertex R2V2 corresponds to the offset amount in the direction of the negative value from the offset amount=0. In other words, the vertex R1V1 corresponds to the offset amount of the central portion RC2 of the read head 15R2 with respect to the offset amount=0. In the example illustrated in FIG. 8, the vertex R2V2 is the same as the vertex R1V2. Note that the vertex R2V2 may be different from the vertex R1V2. The change MPE2 of the error rate changes in a quartic curve having the maximum value MPV2 and the minimum values MPV3 and MPV4. The change MPE2 of the error rate is the minimum at the minimum values MPV3 and MPV4. The maximum value MPV2 is larger than the minimum values MPV3 and MPV4. The maximum value MPV2 corresponds to the offset amount=0 (middle portion MP). The minimum value MPV3 corresponds to the offset amount of the central portion RC1 (vertex R1V2) of the read head 15R1 with respect to the middle portion MP=0. The minimum value MPV4 corresponds to the offset amount of the central portion RC2 (vertex R2V2) of the read head 15R2 with respect to the middle portion MP=0. The maximum value MPV2 is larger than the minimum values MPV3 and MPV4. The minimum value MPV3 and the minimum value MPV4 are identical to each other. The minimum value MPV3 and the minimum value MPV4 may be different from each other. The minimum value MPV3 may be identical to or different from the vertex R1V2. In addition, the minimum value MPV4 may be identical to or different from the vertex R2V2. FIG. 8 illustrates the cross track separation CTS2 between the vertex R1V2 (minimum value MPV3) and the vertex R2V2 (minimum value MPV4). The cross track separation CTS2 is larger than the track width (or the track pitch) of the particular track located in the large region. The cross track separation CTS2 is larger than the cross track separation CTS1 illustrated in FIG. 6.

In the example illustrated in FIG. 8, the read/write controller 610 positions the middle portion HP at the target track so as to minimize the error rate based on the cross track separation CTS2. For example, in reading the target track located in the inner circumferential region IR in which the cross track separation is larger than the track width (or the track pitch), the read/write controller 610 determines that the cross track separation CTS2 is larger than the track width of the target track, and positions the middle portion MP at the target track so as to minimize the error rate.

Note that, in reading the target track located in the outer circumferential region OR in which the cross track separation is larger than the track width (or the track pitch), the read/write controller 610 determines that the cross track separation is larger than the track width of the target track, and positions the read head 15R1 or 15R2 at the target track so as to minimize the error rate.

In addition, in reading the target tracks located in the inner circumferential region IR and the outer circumferential region OR in which the cross track separation is larger than the track width (or track pitch), the read/write controller 610 may determine that the cross track separation is larger than the track width of the target track, and may position the middle portion MP at the target track.

Figure 9:
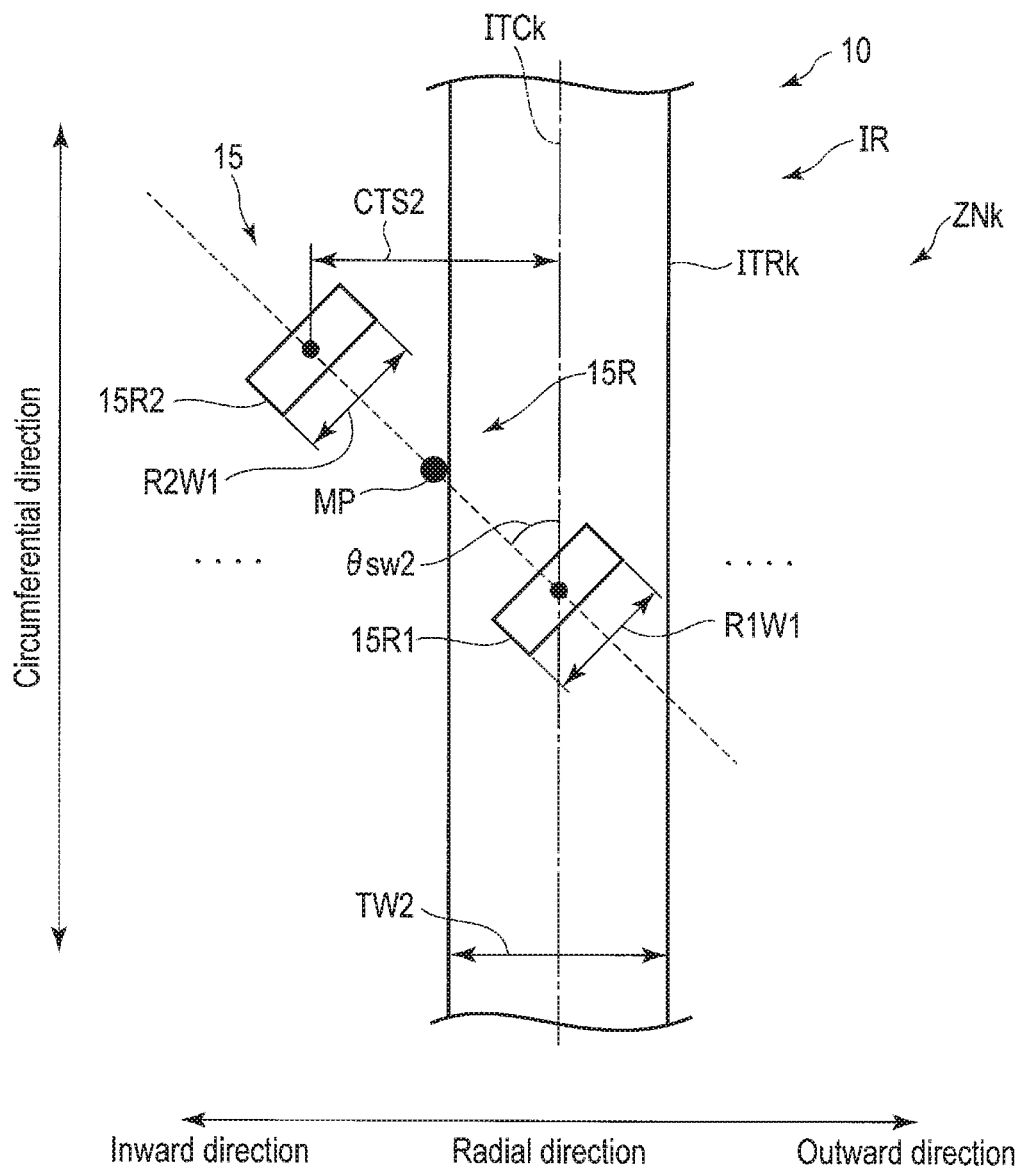
FIG. 9 is a diagram illustrating an example of the arrangement of the read head corresponding to FIG. 8.

FIG. 9 is a diagram illustrating an example of the arrangement of the read head 15R corresponding to FIG. 8. FIG. 9 illustrates only the configuration necessary for explanation. FIG. 9 illustrates the target track ITRk of the zone ZNk located in the inner circumferential region IR in the inward direction from the middle circumferential region MR including the reference position RP0. In the example illustrated in FIG. 9, the read head 15R1, the read head 15R2, and the middle portion MP are inclined inward at a skew angle θsw2 with respect to the circumferential direction. The read heads 15R1 and 15R2 are separated from each other by the cross track separation CTS2. The cross track separation CTS2 is smaller than the track width (or the track, pitch) TW2 of the target track ITRk. The track width TW2 is, for example, identical to the track width TW1. Note that the track width TW2 may be different from the track width TW1. The read head 15R1 is located at the track center ITCk of the target track ITRk. In the example illustrated in FIG. 9, the read head 15R1 overlaps the target track ITRk. The read head 15R2 does not overlap the target track ITRk.

In the example illustrated in FIG. 9, in reading the target track located in the inner circumferential region IR in which the cross track separation is larger than the track width (or the track pitch), the read/write controller 610 determines that the cross track separation CTS2 is larger than the track width TW2 of the target track ITRk, and positions the read head 15R1 at the track center ITCk of the target track ITRk. When it is determined that the target track ITRk cannot be read by the read head 15R1, the read/write controller 610 positions the read head 15R2 at the track center ITCk of the target track ITRk.

Note that, in reading the target track located in the outer circumferential region OR in which the cross track separation is larger than the track width (or the track pitch), the read/write controller 610 determines that the cross track separation is larger than the track width of the target track, and positions the read head 15R1 at the target track. When it is determined that reading cannot be performed with the read head 15R1 positioned at the target track, the read/write controller 610 positions the read head 15R2 at the target track.

Figure 10:
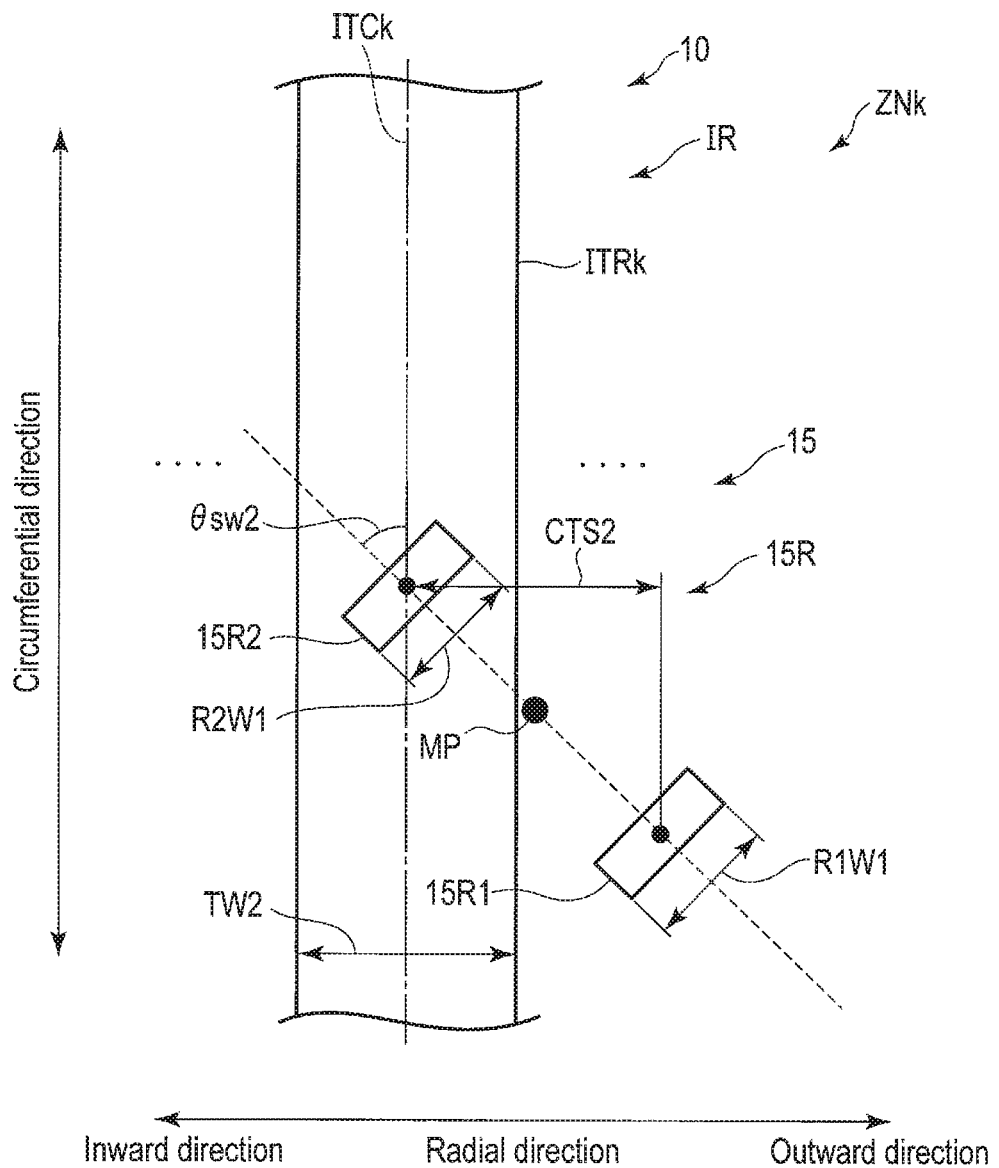
FIG. 10 is a diagram illustrating an example of the arrangement of the read head corresponding to FIG. 8.

FIG. 10 is a diagram illustrating an example of the arrangement of the read head 15R corresponding to FIG. 8. FIG. 10 illustrates only the configuration necessary for explanation. FIG. 10 illustrates the target track ITRk of the zone ZNk located in the inner circumferential region IR in the inward from the middle circumferential region MR including the reference position RP0. The read head 15R2 is located at the track center ITCk of the target track ITRk. In the example illustrated in FIG. 10, the read head 15R2 overlaps the target track ITRk. The read head 15R1 does not overlap the target track ITRk.

In the example illustrated in FIG. 10, in reading the target track located in the inner circumferential region IR in which the cross track separation is larger than the track width (or the track pitch), the read/write controller 610 determines that the cross track separation CTS2 is larger than the track width TW2 of the target track ITRk, and positions the read head 15R2 at the track center ITCk of the target track ITRk. When it is determined that the target track ITRk cannot be read in a state in which the read head 15R2 is positioned at the target track ITRk, the read/write controller 610 positions the read head 15R1 at the track center ITCk of the target track ITRk as illustrated in FIG. 9.

Note that, in reading the target track located in the outer circumferential region OR in which the cross track separation is larger than the track width (or the track pitch), the read/write controller 610 determines that the cross track separation is larger than the track width of the target track, and positions the read head 15R2 at the target track. When it is determined that the target track cannot be read by the read head 15R2, the read/write controller 610 positions the read head 15R1 at the target track.

In addition, in the example illustrated in FIGS. 9 and 10, in reading the target tracks located in the inner circumferential region IR and the outer circumferential region OR in which the cross track separation is larger than the track width (or the track pitch), the read/write controller 610 may determine that the cross track separation is larger than the track width of the target track, and may position the middle portion MP at the track center of the target track.

Figure 11:
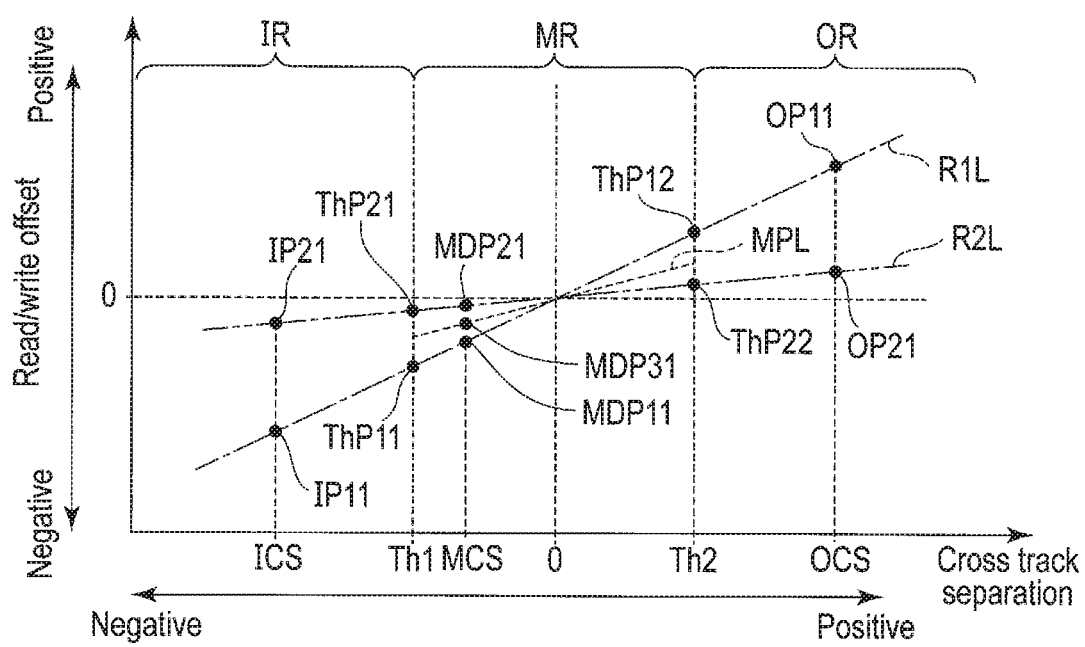
FIG. 11 is a diagram illustrating an example of a relationship between the cross track separation and the read/write offset according to the first embodiment.

FIG. 11 is a diagram illustrating an example of the relationship between the cross track separation and the read/write offset according to the present embodiment.

In FIG. 11, a horizontal axis represents the cross track separation at the particular radial position of the disk 10, and a vertical axis represents the read/write offset at the particular radial position of the disk 10. In the horizontal axis of FIG. 11, the cross track separation increases in the direction of the positive value as it proceeds in the direction of the positive arrow from the cross track separation=0, and the cross track separation decreases in the direction of the negative value as it proceeds in the direction of the negative arrow from the cross track separation=0. FIG. 11 illustrates the cross track separation Th1 when head 15 is positioned at the radial position corresponding to the interface between the narrow region, for example, the middle circumferential region MR including the reference position RP0 and the large region in the inward direction of the narrow region, for example, the inner circumferential region IR, and the cross track separation Th2 when head 15 is positioned at the radial position corresponding to the interface between the narrow region and the large region in the outward direction of the narrow region, for example, the outer circumferential region OR. For example, the absolute value of the cross track separation Th1 is identical to the absolute value of the cross track separation Th2. Note that the absolute value of the cross track separation Th1 and the absolute value of the cross track separation Th2 may be, for example, 0.7 to 1.3 times as large as the track width (or the track pitch). Note that the absolute value of the cross track separation Th1 and the absolute value of the cross track separation Th2 may be smaller than 0.7 times as large as the track width, or may be larger than 1.3 times as large as the track width. In addition, the absolute value of the cross track separation Th1 may be different from the absolute value of the cross track separation Th2. In the horizontal axis of FIG. 11, each cross track separation in the negative direction from the cross track separation Th1 corresponds to each cross track separation when the head 15 is positioned at each radial position of the inner circumferential region IR. In the horizontal axis of FIG. 11, each cross track separation between the cross track separations Th1 and Th2 corresponds to each cross track separation when the head 15 is positioned at each radial position of the middle circumferential region MR. In the horizontal axis of FIG. 11, each cross track separation in the positive direction from the cross track separation Th2 corresponds to each cross track separation when the head 15 is positioned at each radial position of the outer circumferential region OR. In the vertical axis of FIG. 11, the read/write offset increases in the direction of the positive value as it proceeds in the direction of the positive arrow from the read/write offset=0 corresponding to the cross track separation=0, and the read/write offset decreases in the direction of the negative value as it proceeds in the direction of the negative arrow from the read/write offset=0 corresponding to the cross track separation=0. For example, the direction of the positive value of the read/write offset corresponds to the radially outward direction, and the direction of the negative value of the read/write offset corresponds to the radially inward direction. Note that the direction of the positive value of the read/write offset may correspond to the radially inward direction, and the direction of the negative value of the read/write offset may correspond to the radially outward direction. FIG. 11 illustrates the change R1L of the read/write offset with respect to the cross track separation when the read head 15R1 is positioned at each radial position of the disk 10, the change R2L of the read/write offset with respect to the cross track separation when the read head 15R2 is positioned at each radial position of the disk 10, and the change MPL of the read/write offset with the cross track separation when the middle portion MP is positioned at each radial position of the disk 10. As illustrated in FIG. 11, the change R1L of the read/write offset with respect to the cross track separation and the change R2L of the read/write offset with respect to the cross track separation are shown over the cross track separation corresponding to each radial position from the inner circumferential region IR to the outer circumferential region OR. The change MPL of the read/write offset with respect to the cross track separation is shown over the cross track separation corresponding to each radial position of the middle circumferential region MR. Note that the change MPL of the read/write offset with respect to the cross track separation may be shown over the cross track separation corresponding to each radial position from the inner circumferential region IR to the outer circumferential region OR.

In the example illustrated in FIG. 11, the change R1L of the read/write offset with respect to the cross track separation has read/write offsets IP11, ThP11, MDP11, ThP12, and OP11. In the example illustrated in FIG. 11, the read/write offset IP11 is a negative value. The read/write offset IP11 corresponds to the cross track separation ICS when the head 15 is positioned in the negative direction, for example, in the inward direction, from the radial position corresponding to the cross track separation Th1. For example, the read/write offset ThP11 is a negative value. Note the read/write offset ThP11 may be a positive value. The read/write offset ThP11 corresponds to the cross track separation Th1. For example, the read/write offset MDP11 is a negative value. Note that the read/write offset MDP11 may be a positive value. The read/write offset MDP11 corresponds to the cross track separation MCS when the head 15 is positioned at the radial position between the radial position corresponding to the cross track separation Th1 and the radial position corresponding to the cross track separation Th2. For example, the read/write offset ThP12 is a positive value. Note the read/write offset ThP12 may be a negative value. The read/write offset ThP11 corresponds to the cross track separation Th2. For example, the read/write offset OP11 is a positive value. Note the read/write offset OP11 may be a negative value. The read/write offset OP11 corresponds to the cross track separation OCS when the head 15 is positioned in the positive direction, for example, in the outward direction, from the radial position corresponding to the cross track separation Th2.

In the example illustrated in FIG. 11, the change R2L of the read/write offset with respect to the cross track separation has read/write offsets IP21, ThP21, MDP21, ThP22, and OP21. In the example illustrated in FIG. 11, the read/write offset IP21 is a negative value. The read/write offset IP21 corresponds to the cross track separation ICS. For example, the absolute value of the read/write offset IP21 is smaller than the absolute value of the read/write offset IP11. For example, the read/write offset ThP21 is a negative value. Note the read/write offset ThP21 may be a positive value. The read/write offset ThP21 corresponds to the cross track separation Th1. The absolute value of the read/write offset ThP21 is smaller than the absolute value of the read/write offset ThP11. For example, the absolute value of the read/write offset ThP21 is about 0.7 times as much as the absolute value of the read/write offset ThP11. In this case, the cross track separation Th1 corresponds to the radial position at which the absolute value of the read/write offset ThP21 is about 0.7 times as much as the absolute value of the read/write offset ThP11 when the head 15 is positioned. Note that the absolute value of the read/write offset ThP21 may be 0.7 or more times as much as the absolute value of the read/write offset ThP11, or may be smaller than 0.7 times as much as the read/write offset ThP11. For example, the read/write offset MDP21 is a negative value. Note that the read/write offset MDP21 may be a positive value. The read/write offset MDP21 corresponds to the cross track separation MCS. For example, the absolute value of the read/write offset MDP21 is smaller than the absolute value of the read/write offset MDP11. For example, the read/write offset ThP22 is a positive value. Note the read/write offset ThP22 may be a negative value. The read/write offset ThP22 corresponds to the cross track separation Th2. The absolute value of the read/write offset ThP22 is smaller than the absolute value of the read/write offset ThP12. For example, the absolute value of the read/write offset ThP22 is about 0.7 times as much as the absolute value of the read/write offset ThP12. In this case, the cross track separation Th2 corresponds to the radial position at which the absolute value of the read/write offset ThP22 is about 0.7 times as much as the absolute value of the read/write offset ThP12 when the head 15 is positioned. Note that the absolute value of the read/write offset ThP22 may be 0.7 or more times as much as the absolute value of the read/write offset ThP12, or may be smaller than 0.7 times as much as the read/write offset ThP12. For example, the read/write offset OP21 is a positive value. Note the read/write offset OP21 may be a negative value. For example, the absolute value of the read/write offset OP21 is smaller than the absolute value of the read/write offset OP11. The read/write offset OP21 corresponds to the cross track separation OCS.

In the example illustrated in FIG. 11, the change MPL of the read/write offset with respect to the cross track separation has the read/write offset MDP31. In the example illustrated in FIG. 11, the read/write offset MDP31 is a negative value. Note that the read/write offset MDP31 may be a positive value. For example, the absolute value of the read/write offset MDP21 is smaller than the absolute value of the read/write offset MDP11 and larger than the absolute value of the read/write offset MDP21. The read/write offset MDP31 corresponds to the cross track separation MCS.

In the example illustrated in FIG. 11, when the target track is instructed by a command or the like from the host 100 and read processing is performed (hereinafter also referred to as initial reading timing), the read/write controller 610 positions the read head 15R1 with the read/write offset IP11 at the target track located in the large region, for example, the inner circumferential region IR. When the read head 15R1 is positioned at the target track and at least one read retry is performed, the read/write controller 610 positions the read head 15R2 at the target track by deviating from the read/write offset IP11 to the read/write offset IP21.

Note that, at the initial reading timing, the read/write controller 610 may position the read head 15R2 with the read/write offset IP21 at the target track located in the large region, for example, the inner circumferential region IR. When the read head 15R2 is positioned at the target track and at least one read retry is performed, the read/write controller 610 positions the read head 15R1 at the target track by deviating from the read/write offset IP21 to the read/write offset IP11.

In the example illustrated in FIG. 11, at the initial reading timing, the read/write controller 610 positions the middle portion MP with the read/write offset MDP31 at the target track located in the narrow region, for example, the middle circumferential region MR. When the middle portion MP is positioned at the target track and at least one read retry is performed, the read/write controller 610 positions the read head 15R1 at the target track by deviating from the read/write offset MDP31 to the read/write offset MDP11. After positioning the read head 15R1 at the target track, the read/write controller 610 positions the read head 15R2 at the target track by deviating from the read/write offset MDP11 to the read/write offset MDP21.

Note that, when the middle portion MP is positioned at the target track and at least one read retry is performed, the read/write controller 610 may position the read head 15R2 at the target track by deviating the read/write offset MDP 31 to the read/write offset MDP 21. After positioning the read head 15R2 at the target track, the read/write controller 610 positions the read head 15R1 at the target track by deviating from the read/write offset MDP21 to the read/write offset MDP11.

In the example illustrated in FIG. 11, at the initial reading time, the read/write controller 610 positions the read head 15R1 with the read/write offset OP11 at the target track located in the large region, for example, the outer circumferential region OR. When the read head 15R1 is positioned at the target track and at least one read retry is performed, the read/write controller 610 positions the read head 15R2 at the target track by deviating from the read/write offset OP11 to the read/write offset OP21.

Note that, at the initial reading timing, the read/write controller 610 positions the read head 15R2 at the target track located in the large region, for example, the outer circumferential region OR with the read/write offset OP21 and reads the target track by the read head 15R2. When the read head 15R2 is positioned at the target track and at least one read retry is performed, the read/write controller 610 positions the read head 15R1 at the target track by deviating from the read/write offset OP21 to the read/write offset OP11.

The read/write controller 610 may record the relationship between the cross track separation illustrated in FIG. 11 and the read/write offset in the memory, for example, the non-volatile memory 90, the buffer memory 80, the volatile memory 70, or the disk 10.

FIG. 12 is a flowchart illustrating an example of the read processing according to the present embodiment.

The MPU 60 positions the initial read head in the read head 15R at the particular track according to a command from the host 100 based on the cross track separation (CTS) (B1201). For example, when the cross track separation is equal to or less than the particular value, the MPU 60 positions the middle portion MP at the particular track according to the command from the host 100 or the like. When the cross track separation is larger than the particular value, the MPU 60 positions the particular read head among the read heads 15R, for example, the read head 15R1 or the read head 15R2 at the particular track. The MPU 60 determines whether the particular track can be read in a state in which the initial read head is positioned at the particular track (B1202). When it is determined that the reading can be performed (YES in B1202), the MPU 60 ends the processing. When it is determined that the reading cannot be performed (NO in B1202), the MPU 60 determines whether the cross track separation is larger than the particular value or smaller than the particular value (B1203). For example, when the initial read head is positioned at the particular track and at least one read retry is performed, the MPU 60 determines that the particular track cannot be read in a state in which the initial read head is positioned at the particular track, and determines whether the cross track separation is larger than the track width (or the track pitch) of the particular track or less than the track width (or the track pitch). In other words, when the initial read head is positioned at the particular track and at least one read retry is performed, the MPU 60 determines that the particular track cannot be read in a state in which the initial read head is positioned at the particular track, and determines whether the region in which the particular track is located is the large region or the narrow region. That is, when the initial read head is positioned at the particular track and at least one read retry is performed, the MPU 60 determines that the particular track cannot be read in a state in which the initial read head is positioned at the particular track, and determines whether the read head 15R1 or 15R2 is positioned at the particular track as the initial read head, or whether the middle portion MP is positioned at the particular track as the initial read head. When it is determined that the cross track separation is larger than the particular value (YES in B1203), the MPU 60 proceeds to the processing of B1206. In other words, when it is determined that the modified read head (hereinafter also referred to as the first modified read head) different from the initial read head is positioned at the particular track since the cross track separation is larger than the particular value, the MPU 60 proceeds to the processing of B1205. When it is determined that the cross track separation is equal to or less than the particular value (NO in B1203), the MPU 60 positions the modified read head at the particular track (B1204). In other words, when it is determined that the middle portion MP is positioned at the particular track since the cross track separation is equal to or less than the particular value, the MPU 60 positions the first modified read head among the read heads 15R different from the initial read head at the particular track. The MPU 60 reads the particular track with the modified read head (hereinafter also referred to as the second modified read head) different from the first modified read head (B1205), and ends the processing.

According to the present embodiment, the magnetic disk device 1 includes the read head 15R, for example, the read heads 15R1 and 15R2. The magnetic disk device 1 positions the middle portion MP at the particular track located in the narrow region according to a command from the host 100 or the like. When the middle portion MP is positioned at the particular track and at least one read retry (or a plurality of read tries) is performed, the magnetic disk device 1 positions the read head 15R1 at the particular track. After positioning the read head 15R1 at the particular track, the magnetic disk device 1 positions the read head 15R2 at the particular track. The magnetic disk device 1 positions the read head 15R1 (or the read head 15R2) at the particular track located in the large region according to a command from the host 100 or the like. When the read head 15R1 (or the read head 15R2) is positioned at the particular track and at least one read try (or a plurality of read tries) is performed, the magnetic disk device 1 positions the read head 15R2 at the particular track. Therefore, the magnetic disk device 1 can position the appropriate read head among the read heads 15R at the particular track based on the cross track separation, without performing the processing of selecting the appropriate read head from the read heads 15R, or the processing of adjusting and positioning the selected read head at the optimum position. In addition, when the initial read head is positioned at the particular track and at least one read retry is performed, the magnetic disk device 1 can shorten the read retry time by positioning at least one modified read head different from the initial read head among the read heads 15R at the particular track based on the cross track separation. Therefore, the magnetic disk device 1 can improve the read processing performance.

Next, a magnetic disk device according to another embodiment will be described. In another embodiment, the same reference numerals are assigned to the same parts as those of the above-described embodiment, and the detailed description thereof will be omitted.

Second Embodiment

A magnetic disk device 1 of a second embodiment differs from the magnetic disk device 1 of the first embodiment in terms of a read head 15R.

FIG. 13 is a diagram illustrating an example of the arrangement of the read head 15R according to the second embodiment. FIG. 13 illustrates only the configuration necessary for explanation. FIG. 13 illustrates a target track ITRm of a zone ZNm located in an inner circumferential region IR in an inward direction from a middle circumferential region MR including a reference position RP0, and a track (hereinafter also referred to as an adjacent track) ITRm+1 adjacent to the target track ITRm in the zone ZNm in an inward direction. The adjacent track ITRm+1 may be adjacent to the target track ITRm in an outward direction. The adjacent track ITRm+1 is overwritten on the target track ITRm in the inward direction. A track width TW3 of a target track ITRm is smaller than a track width TW2 of the adjacent track ITRm+1. A read head 15R2 is located at the track center ITCm of the target track ITRm. In the example illustrated in FIG. 13, the read head 15R2 overlaps the target track ITRm. A read head 15R1 does not overlap the target track ITRm. For example, a width R2W2 of the read head 15R2 is identical to a width R1W1 of the read head 15R1. Note that the width of the read head 15R1 may be smaller than the width of the read head 15R2. For example, the error rate when the read head 15R2 is positioned at the target track ITRm and the target track ITRm is read by the read head 15R2 may be smaller than the error rate when the read head 15R1 is positioned at the target track ITRm and the target track ITRm is read by the read head 15R1. For example, the error rate when the read head 15R1 is positioned at the target track ITRm and the target track ITRm is read by the read head 15R1 is smaller than the error rate when the read head 15R2 is positioned at the target track ITRm and the target track ITRm is read by the read head 15R2. In addition, for example, the error rate when the read head 15R1 is positioned at the adjacent track ITRm+1 and the adjacent track ITRm+1 is read by the read head 15R1 is smaller than the error rate when the read head 15R2 is positioned at the adjacent track ITRm+1 and the adjacent track ITRm+1 is read by the read head 15R2. For example, the error rate when the read head 15R2 is positioned at the adjacent track ITRm+1 and the adjacent track ITRm+1 is read by the road head 15R2 may be smaller than the error rate when the read head 15R1 is positioned at the adjacent track ITRm+1 and the adjacent track ITRm+1 is read by the read head 15R1.

In the example illustrated in FIG. 13, when the track width TW3 of the target track ITRm located in the inner circumferential region IR in which the cross track separation is larger than the track width (or the track pitch) is smaller than the track width of the peripheral track, for example, the track width TW2 of the adjacent track ITRm+1, a read/write controller 610 positions the read head 15R2 having the smaller width among the read heads 15R1 and 15R2 at the track center ITCm of the target track ITRm. When it is determined that the target track ITRm cannot be read in a state in which the read head 15R2 is positioned at the target track ITRm, the read/write controller 610 positions the read head 15R1 at the track center ITCm of the target track ITRm.

Note that, when the track width of the target track located in the outer circumferential region OR in which the cross track separation is larger than the track width (or the track pitch) is smaller than the track width of the peripheral track, for example, the track width of the adjacent track, the read/write controller 610 positions the read head 15R2 having the smaller width among the read heads 15R1 and 15R2 at the target track. When it is determined that the target track cannot be read in a state in which the read head 15R2 is positioned at the target track, the read/write controller 610 positions the read head 15R1 at the target track.

In reading the target track ITRm+1 that is located in the inner circumferential region IR in which the cross track separation is larger than the track width (or the track pitch) and has the track width TW2 larger than the track width TW3 of the adjacent track ITRm, the read/write controller 610 positions the read head 15R1 having the larger width among the read heads 15R1 and 15R2 at (the track center of) the target track ITRm+1. When it is determined that the target track ITRm+1 cannot be read in a state in which the read head 15R1 is positioned at the target track ITRm+1, the read/write controller 610 positions the read head 15R2 at (the track center of) the target track ITRm+1.

In addition, when it is determined that the target track cannot be read in a state in which a middle portion MP is positioned at the target track having the track width smaller than the track width of the peripheral track in the middle circumferential region (narrow region) MR in which the cross track separation is smaller than the track width (or the track pitch), the read/write controller 610 positions the read head 15R2 having the smaller width among the read heads 15R1 and 15R2 at the target track. After positioning the read head 15R2 at the target track, the read/write controller 610 positions the read head 15R1 at the target track.

In the example illustrated in FIG. 13, in reading the target tracks located in the inner circumferential region IR and the outer circumferential region OR in which the cross track separation is larger than the track width (or the track pitch), the read/write controller 610 may determine that the cross track separation is larger than the track width of the target track, and may position the middle portion MP at the track center of the target track.

According to the second embodiment, the magnetic disk device 1 includes the read head 15R, for example, the read heads 15R1 and 15R2. A width R2W2 of the read head 15R2 is smaller than a width R1W1 of the read head 15R1. In reading the particular track located in the large region according to a command from a host 100 or the like, the magnetic disk device 1 determines whether the track width of the particular track is equal to or less than the track width (or the track pitch) of the peripheral track, for example, the adjacent track, or larger than the track width of the adjacent track. When it is determined that the track width of the particular track located in the large region is equal to or less than the track width (or the track pitch) of the adjacent track, the magnetic disk device 1 positions the read head 15R2 having the smaller width among the read heads 15R1 and 15R2 at the particular track. In addition, when it is determined that the particular track cannot be read in a state in which the middle portion MP is positioned at the particular track having the track width smaller than the track width (or the track pitch) of the peripheral track in the narrow region, the magnetic disk device 1 positions the read head 15R2 having the smaller width among the read heads 15R1 and 15R2 at the particular track. Therefore, when the track width of the particular track is equal to or less than the particular value, for example, the track width (or the track pitch) of the peripheral track, the magnetic disk device 1 positions, for example, the initial read head having the smallest width among the read heads 15R at the particular track. Therefore, the magnetic disk device 1 can improve the read processing performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head comprising a write head that writes data to the disk, and a first read head and a second read head that read data from the disk; and
   a controller that, in reading a first track of a first region of the disk, positions a middle portion of the first read head and the second read head at a first track center of the first track, and in reading a second track of a second region of the disk different from the first region, positions any one of the first read head and the second read head at a second track center of the second track,
   wherein
   when the middle portion is positioned at the first track center in the first region and read retry is repeatedly performed, the controller positions any one of the first read head and the second read head at the first track center in the first region.

2. The magnetic disk device according to claim 1, wherein, when the middle portion is positioned at the first track center in the first region and read retry is repeatedly performed, the controller positions any one of the first read head and the second read head at the first track center in the first region and then positions the other of the first read head and the second read head at the first track center.

3. The magnetic disk device according to claim 1, wherein, when any one of the first read head and the second read head is positioned at the second track center in the second region and read retry is repeatedly performed, the controller positions the other of the first read head and the second read head at the second track center in the second region.

4. The magnetic disk device according to claim 1, wherein, when the middle portion is positioned at a third track center of a third track in the first region having the third track having a radial width smaller than that of the first track and read retry is repeatedly performed, the controller positions one read head having a smaller width among the first read head and the second read head at the third track center in the first region.

5. The magnetic disk device according to claim 1, wherein the controller positions one read head having a larger width among the first read head and the second read head at the second track center in the second region having a fourth track having a radial width smaller than that of the second track.

6. The magnetic disk device according to claim 1, wherein the controller positions one read head having a smaller width among the first read head and the second read head at a fourth track center of the fourth track in the second region having the fourth track having a radial width smaller than that of the second track.

7. The magnetic disk device according to claim 1, wherein a radial head interval of the disk between the first read head and the second read head in the second region is larger than a radial head interval in the first region.

8. The magnetic disk device according to claim 7, wherein the head interval is equal to or less than a threshold in the first region and larger than the threshold in the second region.

9. A read processing method applied to a magnetic disk device comprising a disk, a head comprising a write head that writes data to the disk, and a first read head and a second read head that read data from the disk, the read processing method comprising:
in reading a first track of a first region of the disk, positioning a middle portion of the first read head and the second read head at a first track center of the first track;
in reading a second track of a second region of the disk different from the first region, positioning any one of the first read head and the second read head at a second track center of the second track; and
when the middle portion is positioned at the first track center in the first region and read retry is repeatedly performed, positioning any one of the first read head and the second read head at the first track center in the first region.

10. The read processing method according to claim 9, further comprising:
when the middle portion is positioned at the first track center in the first region and read retry is repeatedly performed, positioning any one of the first read head and the second read head at the first track center in the first region and then positions the other of the first read head and the second read head at the first track center.

11. The read processing method according to claim 9, further comprising:
when any one of the first read head and the second read head is positioned at the second track center in the second region and read retry is repeatedly performed, positioning the other of the first read head and the second read head at the second track center in the second region.

12. The read processing method according to claim 9, further comprising:
when the middle portion is positioned at a third track center of a third track in the first region having the third track having a radial width smaller than that of the first track and read retry is repeatedly performed, positioning one read head having a smaller width among the first read head and the second read head at the third track center in the first region.

13. The read processing method according to claim 9, further comprising:
positioning one read head having a larger width among the first read head and the second read head at the second track center in the second region having a fourth track having a radial width smaller than that of the second track.

14. The read processing method according to claim 9, further comprising:
positioning one read head having a smaller width among the first read head and the second read head at a fourth track center of the fourth track in the second region having the fourth track having a radial width smaller than that of the second track.

15. The read processing method according to claim 9, wherein a radial head interval of the disk between the first read head and the second read head in the second region is larger than a radial head interval in the first region.

16. The read processing method according to claim 15, wherein the head interval is equal to or less than a threshold in the first region and larger than the threshold in the second region.

* * * * *